United States Patent
Steinberg

(10) Patent No.: US 10,395,029 B1
(45) Date of Patent: Aug. 27, 2019

(54) VIRTUAL SYSTEM AND METHOD WITH THREAT PROTECTION

(71) Applicant: FireEye, Inc., Milpitas, CA (US)

(72) Inventor: Udo Steinberg, Braunschweig (DE)

(73) Assignee: FireEye, Inc., Milpitas, CA (US)

( * ) Notice: Subject to any disclaimer, the term of this patent is extended or adjusted under 35 U.S.C. 154(b) by 160 days.

(21) Appl. No.: 15/199,871

(22) Filed: Jun. 30, 2016

Related U.S. Application Data

(60) Provisional application No. 62/187,100, filed on Jun. 30, 2015.

(51) Int. Cl.
*G06F 21/55* (2013.01)
*G06F 21/56* (2013.01)
*G06F 9/455* (2018.01)

(52) U.S. Cl.
CPC .......... *G06F 21/56* (2013.01); *G06F 9/45558* (2013.01); *G06F 21/554* (2013.01); *G06F 2009/45587* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,878,560 A | 3/1999 | Johnson | |
| 6,013,455 A | 1/2000 | Bandman et al. | |
| 7,409,719 B2 * | 8/2008 | Armstrong | G06F 21/53 713/1 |
| 7,424,745 B2 | 9/2008 | Cheston et al. | |
| 7,937,387 B2 | 5/2011 | Frazier et al. | |
| 7,958,558 B1 | 6/2011 | Leake et al. | |
| 7,996,836 B1 * | 8/2011 | McCorkendale | G06F 21/53 713/164 |
| 8,006,305 B2 | 8/2011 | Aziz | |
| 8,010,667 B2 | 8/2011 | Zhang et al. | |
| 8,069,484 B2 | 11/2011 | McMillan et al. | |
| 8,151,263 B1 | 4/2012 | Venkitachalam et al. | |

(Continued)

FOREIGN PATENT DOCUMENTS

| | | |
|---|---|---|
| WO | 2011/112348 A1 | 9/2011 |
| WO | 2012135192 A2 | 10/2012 |

(Continued)

OTHER PUBLICATIONS

U.S. Appl. No. 15/199,873, filed Jun. 30, 2016 Non-Final Office Action dated Feb. 9, 2018.

(Continued)

*Primary Examiner* — Piotr Poltorak
(74) *Attorney, Agent, or Firm* — Rutan & Tucker, LLP

(57) ABSTRACT

A computing device is described that comprises one or more hardware processors and a memory communicatively coupled to the one or more hardware processors. The memory comprises software that supports a software virtualization architecture, including (i) a virtual machine operating in a guest environment and including a process that is configured to monitor behaviors of data under analysis within the virtual machine and (ii) a threat protection component operating in a host environment. The threat protection component is configured to classify the data under analysis as malicious or non-malicious based on the monitored behaviors.

34 Claims, 7 Drawing Sheets

(56) References Cited

U.S. PATENT DOCUMENTS

| | | | |
|---|---|---|---|
| 8,171,553 | B2 | 5/2012 | Aziz et al. |
| 8,201,169 | B2 | 6/2012 | Venkitachalam et al. |
| 8,204,984 | B1 | 6/2012 | Aziz et al. |
| 8,233,882 | B2 | 7/2012 | Rogel |
| 8,266,395 | B2 * | 9/2012 | Li .................... G06F 9/45558 711/113 |
| 8,271,978 | B2 | 9/2012 | Bennett et al. |
| 8,290,912 | B1 | 10/2012 | Searls et al. |
| 8,291,499 | B2 | 10/2012 | Aziz et al. |
| 8,332,571 | B1 | 12/2012 | Edwards, Sr. |
| 8,347,380 | B1 * | 1/2013 | Satish .................... G06F 11/00 708/200 |
| 8,353,031 | B1 | 1/2013 | Rajan et al. |
| 8,375,444 | B2 | 2/2013 | Aziz et al. |
| 8,387,046 | B1 | 2/2013 | Montague et al. |
| 8,397,306 | B1 | 3/2013 | Tormasov |
| 8,418,230 | B1 | 4/2013 | Cornelius et al. |
| 8,479,276 | B1 | 7/2013 | Vaystikh et al. |
| 8,479,294 | B1 | 7/2013 | Li et al. |
| 8,510,827 | B1 | 8/2013 | Leake et al. |
| 8,516,593 | B2 | 8/2013 | Aziz |
| 8,522,236 | B2 | 8/2013 | Zimmer et al. |
| 8,528,086 | B1 | 9/2013 | Aziz |
| 8,539,582 | B1 | 9/2013 | Aziz et al. |
| 8,549,638 | B2 | 10/2013 | Aziz |
| 8,561,177 | B1 | 10/2013 | Aziz et al. |
| 8,566,476 | B2 | 10/2013 | Shiffer et al. |
| 8,566,946 | B1 | 10/2013 | Aziz et al. |
| 8,584,239 | B2 | 11/2013 | Aziz et al. |
| 8,612,659 | B1 | 12/2013 | Serebrin et al. |
| 8,635,696 | B1 | 1/2014 | Aziz |
| 8,689,333 | B2 | 4/2014 | Aziz |
| 8,713,681 | B2 | 4/2014 | Silberman et al. |
| 8,756,696 | B1 | 6/2014 | Miller |
| 8,775,715 | B2 | 7/2014 | Tsirkin et al. |
| 8,776,180 | B2 | 7/2014 | Kumar et al. |
| 8,776,229 | B1 | 7/2014 | Aziz |
| 8,793,278 | B2 | 7/2014 | Frazier et al. |
| 8,793,787 | B2 | 7/2014 | Ismael et al. |
| 8,799,997 | B2 | 8/2014 | Spiers et al. |
| 8,805,947 | B1 | 8/2014 | Kuzkin et al. |
| 8,832,352 | B2 | 9/2014 | Tsirkin et al. |
| 8,832,829 | B2 | 9/2014 | Manni et al. |
| 8,839,245 | B1 | 9/2014 | Khajuria et al. |
| 8,850,060 | B1 | 9/2014 | Beloussov et al. |
| 8,850,571 | B2 | 9/2014 | Staniford et al. |
| 8,863,279 | B2 | 10/2014 | McDougal et al. |
| 8,875,295 | B2 * | 10/2014 | Lutas .................... G06F 12/109 726/24 |
| 8,881,271 | B2 | 11/2014 | Butler, II |
| 8,881,282 | B1 | 11/2014 | Aziz et al. |
| 8,898,788 | B1 | 11/2014 | Aziz et al. |
| 8,910,238 | B2 | 12/2014 | Lukacs et al. |
| 8,935,779 | B2 | 1/2015 | Manni et al. |
| 8,949,257 | B2 | 2/2015 | Shifter et al. |
| 8,984,478 | B2 | 3/2015 | Epstein |
| 8,984,638 | B1 | 3/2015 | Aziz et al. |
| 8,990,939 | B2 | 3/2015 | Staniford et al. |
| 8,990,944 | B1 | 3/2015 | Singh et al. |
| 8,997,219 | B2 | 3/2015 | Staniford et al. |
| 9,003,402 | B1 | 4/2015 | Carbone et al. |
| 9,009,822 | B1 | 4/2015 | Ismael et al. |
| 9,009,823 | B1 | 4/2015 | Ismael et al. |
| 9,027,125 | B2 | 5/2015 | Kumar et al. |
| 9,027,135 | B1 | 5/2015 | Aziz |
| 9,071,638 | B1 | 6/2015 | Aziz et al. |
| 9,087,199 | B2 | 7/2015 | Sallam |
| 9,092,616 | B2 | 7/2015 | Kumar et al. |
| 9,092,625 | B1 | 7/2015 | Kashyap et al. |
| 9,104,867 | B1 | 8/2015 | Thioux et al. |
| 9,106,630 | B2 | 8/2015 | Frazier et al. |
| 9,106,694 | B2 | 8/2015 | Aziz et al. |
| 9,117,079 | B1 | 8/2015 | Huang et al. |
| 9,118,715 | B2 | 8/2015 | Staniford et al. |
| 9,159,035 | B1 | 10/2015 | Ismael et al. |
| 9,171,160 | B2 | 10/2015 | Vincent et al. |
| 9,176,843 | B1 | 11/2015 | Ismael et al. |
| 9,189,627 | B1 | 11/2015 | Islam |
| 9,195,829 | B1 | 11/2015 | Goradia et al. |
| 9,197,664 | B1 | 11/2015 | Aziz et al. |
| 9,213,651 | B2 | 12/2015 | Malyugin et al. |
| 9,223,972 | B1 | 12/2015 | Vincent et al. |
| 9,225,740 | B1 | 12/2015 | Ismael et al. |
| 9,241,010 | B1 | 1/2016 | Bennett et al. |
| 9,251,343 | B1 | 2/2016 | Vincent et al. |
| 9,262,635 | B2 | 2/2016 | Paithane et al. |
| 9,268,936 | B2 | 2/2016 | Butler |
| 9,275,229 | B2 | 3/2016 | LeMasters |
| 9,282,109 | B1 | 3/2016 | Aziz et al. |
| 9,292,686 | B2 | 3/2016 | Ismael et al. |
| 9,294,501 | B2 | 3/2016 | Mesdaq et al. |
| 9,300,686 | B2 | 3/2016 | Pidathala et al. |
| 9,306,960 | B1 | 4/2016 | Aziz |
| 9,306,974 | B1 | 4/2016 | Aziz et al. |
| 9,311,479 | B1 | 4/2016 | Manni et al. |
| 9,355,247 | B1 | 5/2016 | Thioux et al. |
| 9,356,944 | B1 | 5/2016 | Aziz |
| 9,363,280 | B1 | 6/2016 | Rivlin et al. |
| 9,367,681 | B1 | 6/2016 | Ismael et al. |
| 9,398,028 | B1 | 7/2016 | Karandikar et al. |
| 9,413,781 | B2 | 8/2016 | Cunningham et al. |
| 9,426,071 | B1 | 8/2016 | Caldejon et al. |
| 9,430,646 | B1 | 8/2016 | Mushtaq et al. |
| 9,432,389 | B1 | 8/2016 | Khalid et al. |
| 9,438,613 | B1 | 9/2016 | Paithane et al. |
| 9,438,622 | B1 | 9/2016 | Staniford et al. |
| 9,438,623 | B1 | 9/2016 | Thioux et al. |
| 9,459,901 | B2 | 10/2016 | Jung et al. |
| 9,467,460 | B1 | 10/2016 | Otvagin et al. |
| 9,483,644 | B1 | 11/2016 | Paithane et al. |
| 9,495,180 | B2 | 11/2016 | Ismael |
| 9,497,213 | B2 | 11/2016 | Thompson et al. |
| 9,507,935 | B2 | 11/2016 | Ismael et al. |
| 9,516,057 | B2 | 12/2016 | Aziz |
| 9,519,782 | B2 | 12/2016 | Aziz et al. |
| 9,536,091 | B2 | 1/2017 | Paithane et al. |
| 9,537,972 | B1 | 1/2017 | Edwards et al. |
| 9,560,059 | B1 | 1/2017 | Islam |
| 9,563,488 | B2 * | 2/2017 | Fadel .................... G06F 9/541 |
| 9,565,202 | B1 | 2/2017 | Kindlund et al. |
| 9,591,015 | B1 | 3/2017 | Amin et al. |
| 9,591,020 | B1 | 3/2017 | Aziz |
| 9,594,904 | B1 | 3/2017 | Jain et al. |
| 9,594,905 | B1 | 3/2017 | Ismael et al. |
| 9,594,912 | B1 | 3/2017 | Thioux et al. |
| 9,609,007 | B1 | 3/2017 | Rivlin et al. |
| 9,626,509 | B1 | 4/2017 | Khalid et al. |
| 9,628,498 | B1 | 4/2017 | Aziz et al. |
| 9,628,507 | B2 | 4/2017 | Haq et al. |
| 9,633,134 | B2 | 4/2017 | Ross |
| 9,635,039 | B1 | 4/2017 | Islam et al. |
| 9,641,546 | B1 | 5/2017 | Manni et al. |
| 9,654,485 | B1 | 5/2017 | Neumann |
| 9,661,009 | B1 | 5/2017 | Karandikar et al. |
| 9,661,018 | B1 | 5/2017 | Aziz |
| 9,674,298 | B1 | 6/2017 | Edwards et al. |
| 9,680,862 | B2 | 6/2017 | Ismael et al. |
| 9,690,606 | B1 | 6/2017 | Ha et al. |
| 9,690,933 | B1 | 6/2017 | Singh et al. |
| 9,690,935 | B2 | 6/2017 | Shiffer et al. |
| 9,690,936 | B1 | 6/2017 | Malik et al. |
| 9,736,179 | B2 | 8/2017 | Ismael |
| 9,747,446 | B1 | 8/2017 | Pidathala et al. |
| 9,756,074 | B2 | 9/2017 | Aziz et al. |
| 9,773,112 | B1 | 9/2017 | Rathor et al. |
| 9,781,144 | B1 | 10/2017 | Otvagin et al. |
| 9,787,700 | B1 | 10/2017 | Amin et al. |
| 9,787,706 | B1 | 10/2017 | Otvagin et al. |
| 9,792,196 | B1 | 10/2017 | Ismael et al. |
| 9,824,209 | B1 | 11/2017 | Ismael et al. |
| 9,824,211 | B2 | 11/2017 | Wilson |
| 9,824,216 | B1 | 11/2017 | Khalid et al. |
| 9,825,976 | B1 | 11/2017 | Gomez et al. |
| 9,825,989 | B1 | 11/2017 | Mehra et al. |

(56) References Cited

U.S. PATENT DOCUMENTS

| | | |
|---|---|---|
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 10,033,759 B1 | 7/2018 | Kabra et al. |
| 10,176,095 B2* | 1/2019 | Ferguson ............... G06F 12/08 |
| 10,191,858 B2* | 1/2019 | Tsirkin ............... G06F 12/1441 |
| 2002/0013802 A1 | 1/2002 | Mori et al. |
| 2004/0025016 A1* | 2/2004 | Focke ............... G06F 9/45537 |
| | | 713/164 |
| 2006/0075252 A1* | 4/2006 | Kallahalla ........... G06F 21/6227 |
| | | 713/182 |
| 2006/0112416 A1 | 5/2006 | Ohta et al. |
| 2006/0130060 A1 | 6/2006 | Anderson et al. |
| 2006/0236127 A1 | 10/2006 | Kurien et al. |
| 2006/0248528 A1 | 11/2006 | Oney et al. |
| 2007/0006226 A1 | 1/2007 | Hendel |
| 2007/0055837 A1* | 3/2007 | Rajagopal ........... G06F 12/1475 |
| | | 711/163 |
| 2007/0094676 A1* | 4/2007 | Fresko ............... G06F 9/547 |
| | | 719/330 |
| 2007/0143565 A1* | 6/2007 | Corrigan ............. G06F 12/1036 |
| | | 711/202 |
| 2007/0250930 A1 | 10/2007 | Aziz et al. |
| 2007/0300227 A1 | 12/2007 | Mall et al. |
| 2008/0005782 A1 | 1/2008 | Aziz |
| 2008/0065854 A1 | 3/2008 | Schoenberg et al. |
| 2008/0123676 A1 | 5/2008 | Cummings et al. |
| 2008/0127348 A1* | 5/2008 | Largman ............... G06F 21/56 |
| | | 726/24 |
| 2008/0184367 A1 | 7/2008 | McMillan et al. |
| 2008/0184373 A1* | 7/2008 | Traut ............... G06F 9/45533 |
| | | 726/26 |
| 2008/0222729 A1* | 9/2008 | Chen ............... G06F 21/566 |
| | | 726/24 |
| 2008/0235793 A1 | 9/2008 | Schunter et al. |
| 2008/0244569 A1 | 10/2008 | Challener et al. |
| 2008/0294808 A1 | 11/2008 | Mahalingam et al. |
| 2008/0320594 A1* | 12/2008 | Jiang ............... G06F 21/566 |
| | | 726/24 |
| 2009/0007100 A1 | 1/2009 | Field et al. |
| 2009/0036111 A1 | 2/2009 | Danford et al. |
| 2009/0044024 A1 | 2/2009 | Oberheide et al. |
| 2009/0044274 A1* | 2/2009 | Budko ............... G06F 21/53 |
| | | 726/24 |
| 2009/0089860 A1 | 4/2009 | Forrester et al. |
| 2009/0089879 A1* | 4/2009 | Wang ............... G06F 21/53 |
| | | 726/24 |
| 2009/0106754 A1 | 4/2009 | Liu et al. |
| 2009/0113425 A1 | 4/2009 | Ports et al. |
| 2009/0158432 A1 | 6/2009 | Zheng et al. |
| 2009/0172661 A1 | 7/2009 | Zimmer et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0204964 A1* | 8/2009 | Foley ............... G06F 21/53 |
| | | 718/1 |
| 2009/0254990 A1* | 10/2009 | McGee ............... G06F 21/51 |
| | | 726/22 |
| 2009/0276771 A1 | 11/2009 | Nickolov et al. |
| 2009/0320011 A1 | 12/2009 | Chow et al. |
| 2009/0328221 A1 | 12/2009 | Blumfield et al. |
| 2010/0030996 A1 | 2/2010 | Butler, II |
| 2010/0031360 A1 | 2/2010 | Seshadri et al. |
| 2010/0043073 A1 | 2/2010 | Kuwamura |
| 2010/0100718 A1 | 4/2010 | Srinivasan |
| 2010/0115621 A1 | 5/2010 | Staniford et al. |
| 2010/0191888 A1 | 7/2010 | Serebrin et al. |
| 2010/0192223 A1 | 7/2010 | Ismael et al. |
| 2010/0235647 A1 | 9/2010 | Buer |
| 2010/0254622 A1 | 10/2010 | Kamay et al. |
| 2010/0299665 A1 | 11/2010 | Adams |
| 2010/0306173 A1 | 12/2010 | Frank |
| 2010/0306560 A1 | 12/2010 | Bozek et al. |
| 2011/0004935 A1 | 1/2011 | Mothe et al. |
| 2011/0022695 A1 | 1/2011 | Dalal et al. |
| 2011/0047542 A1 | 2/2011 | Dang et al. |
| 2011/0047544 A1 | 2/2011 | Yehuda et al. |
| 2011/0060947 A1 | 3/2011 | Song et al. |
| 2011/0078794 A1 | 3/2011 | Manni et al. |
| 2011/0078797 A1 | 3/2011 | Beachem et al. |
| 2011/0082962 A1 | 4/2011 | Horovitz et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0153909 A1 | 6/2011 | Dong |
| 2011/0167422 A1 | 7/2011 | Eom et al. |
| 2011/0173213 A1 | 7/2011 | Frazier et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0296412 A1 | 12/2011 | Banga et al. |
| 2011/0296440 A1 | 12/2011 | Laurich et al. |
| 2011/0299413 A1 | 12/2011 | Chatwani et al. |
| 2011/0314546 A1 | 12/2011 | Aziz et al. |
| 2011/0321040 A1 | 12/2011 | Sobel et al. |
| 2011/0321165 A1 | 12/2011 | Capalik et al. |
| 2011/0321166 A1 | 12/2011 | Capalik et al. |
| 2012/0011508 A1 | 1/2012 | Ahmad |
| 2012/0047576 A1 | 2/2012 | Do et al. |
| 2012/0117652 A1 | 5/2012 | Manni et al. |
| 2012/0131156 A1 | 5/2012 | Brandt et al. |
| 2012/0144489 A1 | 6/2012 | Jarrett et al. |
| 2012/0159454 A1 | 6/2012 | Barham et al. |
| 2012/0174186 A1 | 7/2012 | Aziz et al. |
| 2012/0174218 A1 | 7/2012 | McCoy et al. |
| 2012/0198514 A1 | 8/2012 | McCune et al. |
| 2012/0216046 A1 | 8/2012 | McDougal et al. |
| 2012/0216069 A1 | 8/2012 | Bensinger |
| 2012/0222114 A1 | 8/2012 | Shanbhogue |
| 2012/0222121 A1 | 8/2012 | Staniford et al. |
| 2012/0254993 A1* | 10/2012 | Sallam ............... G06F 21/53 |
| | | 726/22 |
| 2012/0254995 A1 | 10/2012 | Sallam |
| 2012/0255002 A1 | 10/2012 | Sallam |
| 2012/0255003 A1 | 10/2012 | Sallam |
| 2012/0255012 A1 | 10/2012 | Sallam |
| 2012/0255015 A1 | 10/2012 | Sahita et al. |
| 2012/0255016 A1 | 10/2012 | Sallam |
| 2012/0255017 A1 | 10/2012 | Sallam |
| 2012/0255021 A1 | 10/2012 | Sallam |
| 2012/0260304 A1* | 10/2012 | Morris ............... G06F 21/56 |
| | | 726/1 |
| 2012/0260345 A1 | 10/2012 | Quinn et al. |
| 2012/0265976 A1 | 10/2012 | Spiers et al. |
| 2012/0291029 A1 | 11/2012 | Kidambi et al. |
| 2012/0297057 A1 | 11/2012 | Ghosh et al. |
| 2012/0311708 A1 | 12/2012 | Agarwal et al. |
| 2012/0317566 A1 | 12/2012 | Santos et al. |
| 2012/0331553 A1 | 12/2012 | Aziz et al. |
| 2013/0007325 A1 | 1/2013 | Sahita et al. |
| 2013/0036470 A1 | 2/2013 | Zhu et al. |
| 2013/0036472 A1 | 2/2013 | Aziz |
| 2013/0047257 A1 | 2/2013 | Aziz |
| 2013/0055256 A1 | 2/2013 | Banga et al. |
| 2013/0086235 A1 | 4/2013 | Ferris |
| 2013/0086299 A1 | 4/2013 | Epstein |
| 2013/0091571 A1 | 4/2013 | Lu |
| 2013/0111593 A1 | 5/2013 | Shankar et al. |
| 2013/0117741 A1 | 5/2013 | Prabhakaran et al. |
| 2013/0117848 A1 | 5/2013 | Golshan et al. |

(56) References Cited

U.S. PATENT DOCUMENTS

| | | |
|---|---|---|
| 2013/0117849 A1 | 5/2013 | Golshan et al. |
| 2013/0159662 A1 | 6/2013 | Iyigun et al. |
| 2013/0179971 A1 | 7/2013 | Harrison |
| 2013/0191924 A1 | 7/2013 | Tedesco et al. |
| 2013/0227680 A1 | 8/2013 | Pavlyushchik |
| 2013/0227691 A1 | 8/2013 | Aziz et al. |
| 2013/0247186 A1 | 9/2013 | LeMasters |
| 2013/0282776 A1 | 10/2013 | Durrant et al. |
| 2013/0283370 A1 | 10/2013 | Vipat et al. |
| 2013/0291109 A1 | 10/2013 | Staniford et al. |
| 2013/0298243 A1 | 11/2013 | Kumar et al. |
| 2013/0298244 A1 | 11/2013 | Kumar et al. |
| 2013/0312098 A1 | 11/2013 | Kapoor et al. |
| 2013/0312099 A1 | 11/2013 | Edwards et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0326625 A1 | 12/2013 | Anderson et al. |
| 2013/0333033 A1* | 12/2013 | Khesin .................. G06F 21/55 726/23 |
| 2013/0333040 A1 | 12/2013 | Diehl et al. |
| 2013/0347131 A1* | 12/2013 | Mooring ............ G06F 9/45558 726/29 |
| 2014/0006734 A1 | 1/2014 | Li et al. |
| 2014/0019963 A1 | 1/2014 | Deng et al. |
| 2014/0032875 A1 | 1/2014 | Butler |
| 2014/0075522 A1 | 3/2014 | Paris et al. |
| 2014/0089266 A1 | 3/2014 | Une et al. |
| 2014/0096134 A1 | 4/2014 | Barak et al. |
| 2014/0115578 A1 | 4/2014 | Cooper et al. |
| 2014/0115652 A1 | 4/2014 | Kapoor et al. |
| 2014/0130158 A1 | 5/2014 | Wang et al. |
| 2014/0137180 A1 | 5/2014 | Lukacs et al. |
| 2014/0157407 A1 | 6/2014 | Krishnan et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0208123 A1 | 7/2014 | Roth et al. |
| 2014/0230024 A1 | 8/2014 | Uehara et al. |
| 2014/0237600 A1 | 8/2014 | Silberman et al. |
| 2014/0245423 A1* | 8/2014 | Lee .................... H04L 63/0218 726/12 |
| 2014/0259169 A1 | 9/2014 | Harrison |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0289105 A1 | 9/2014 | Sirota et al. |
| 2014/0304819 A1 | 10/2014 | Ignatchenko et al. |
| 2014/0310810 A1 | 10/2014 | Brueckner et al. |
| 2014/0325644 A1 | 10/2014 | Oberg et al. |
| 2014/0337836 A1 | 11/2014 | Ismael |
| 2014/0344926 A1 | 11/2014 | Cunningham et al. |
| 2014/0351810 A1 | 11/2014 | Pratt et al. |
| 2014/0359239 A1 | 12/2014 | Hiremane et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0013008 A1 | 1/2015 | Lukacs et al. |
| 2015/0095661 A1* | 4/2015 | Sell .................... G06F 12/1408 713/193 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0121135 A1 | 4/2015 | Pape |
| 2015/0128266 A1 | 5/2015 | Tosa |
| 2015/0172300 A1 | 6/2015 | Cochenour |
| 2015/0180886 A1 | 6/2015 | Staniford et al. |
| 2015/0186645 A1 | 7/2015 | Aziz et al. |
| 2015/0199514 A1 | 7/2015 | Tosa et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0244732 A1 | 8/2015 | Golshan et al. |
| 2015/0304716 A1* | 10/2015 | Sanchez-Leighton ...................... G06F 21/53 725/31 |
| 2015/0317495 A1 | 11/2015 | Rodgers et al. |
| 2015/0318986 A1* | 11/2015 | Novak .................. H04L 9/0894 713/189 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0048680 A1 | 2/2016 | Lutas et al. |
| 2016/0057123 A1 | 2/2016 | Jiang et al. |
| 2016/0127393 A1 | 5/2016 | Aziz et al. |
| 2016/0191547 A1* | 6/2016 | Zafar .................. H04L 63/1416 726/23 |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2016/0371105 A1 | 12/2016 | Sieffert et al. |
| 2017/0083703 A1 | 3/2017 | Abbasi et al. |
| 2017/0124326 A1* | 5/2017 | Wailly .................. G06F 21/566 |
| 2017/0213030 A1 | 7/2017 | Mooring et al. |
| 2017/0344496 A1 | 11/2017 | Chen et al. |
| 2017/0364677 A1 | 12/2017 | Soman et al. |
| 2018/0013770 A1 | 1/2018 | Ismael |
| 2018/0048660 A1 | 2/2018 | Paithane et al. |

FOREIGN PATENT DOCUMENTS

| | | |
|---|---|---|
| WO | 2012154664 A2 | 11/2012 |
| WO | 2012177464 A1 | 12/2012 |
| WO | 2013/067505 A1 | 5/2013 |
| WO | 2013091221 A1 | 6/2013 |
| WO | 2014004747 A2 | 1/2014 |

OTHER PUBLICATIONS

U.S. Appl. No. 15/199,876, filed Jun. 30, 2016 Non-Final Office Action dated Jan. 10, 2018.

U.S. Appl. No. 15/197,634, filed Jun. 29, 2016 Notice of Allowance dated Apr. 18, 2018.

U.S. Appl. No. 15/199,873, filed Jun. 30, 2016 Final Office Action dated Sep. 10, 2018.

U.S. Appl. No. 15/199,876, filed Jun. 30, 2016 Final Office Action dated Jul. 5, 2018.

U.S. Appl. No. 15/199,882, filed Jun. 30, 2016 Advisory Action dated Nov. 8, 2018.

U.S. Appl. No. 15/199,882, filed Jun. 30, 2016 Final Office Action dated Aug. 31, 2018.

U.S. Appl. No. 15/199,882, filed Jun. 30, 2016 Non-Final Office Action dated Apr. 5, 2018.

U.S. Appl. No. 15/199,882, filed Jun. 30, 2016 Non-Final Office Action dated Dec. 20, 2018.

U.S. Appl. No. 15/199,871, filed Jun. 30, 2016.

U.S. Appl. No. 15/199,873, filed Jun. 30, 2016.

U.S. Appl. No. 15/199,876, filed Jun. 30, 2016.

U.S. Appl. No. 15/199,882, filed Jun. 30, 2016.

* cited by examiner

VIRTUAL SYSTEM AND METHOD WITH THREAT PROTECTION

CROSS REFERENCE TO RELATED APPLICATIONS

This application is based upon and claims the benefit of priority from U.S. Provisional Patent Application No. 62/187,100 filed Jun. 30, 2015, the entire contents of which are incorporated herein by reference.

FIELD

Embodiments of the disclosure relate to the field of malware detection. More specifically, one embodiment of the disclosure relates to a hypervisor-based, malware detection architecture with OS-specific threat protection positioned within the host environment.

GENERAL BACKGROUND

In general, virtualization is a technique for hosting different guest operating systems concurrently on the same computing platform. With the emergence of hardware support for full virtualization in an increased number of hardware processor architectures, new virtualization software architectures have emerged. One such virtualization architecture involves adding a software abstraction layer, sometimes referred to as a virtualization layer, between the physical hardware and a virtual machine (referred to as "VM").

A VM is a software abstraction that operates like a physical (real) computing device having a particular operating system. A VM typically features pass-through physical and/or emulated virtual system hardware, and guest system software. The virtual system hardware is implemented by software components in the host (e.g., virtual central processing unit "vCPU" or virtual disk) that are configured to operate in a similar manner as corresponding physical components (e.g., physical CPU or hard disk). The guest system software, when executed, controls execution and allocation of virtual resources so that the VM operates in manner consistent to operations of the physical computing device. As a result, the virtualization software architecture allows for a computing device, which may be running one type of "host" operating system (OS), to support a VM that operates like another computing device that is running another OS type.

In some malware detection systems, malware detection components and malware classification components are deployed as part of the same binary (executable). This poses significant issues. Firstly, this deployment offers no safeguards for detecting whether any portion of the malware detection component or malware classification component has become infected with malware. Secondly, when placed in the same binary, the malware detection component is not logically isolated from a malware classification component. As a result, remediation of injected malicious code that has migrated into the malware detection component would also require analysis of the integrity of the malware classification component. This increases the overall amount of time (and cost) for remediation.

Lastly, an attacker may often exploit a user process and then proceed to attack the guest OS kernel. Advanced attackers may attack the guest OS kernel directly. In some cases, threat protection in the guest user mode (e.g., guest process) or the guest kernel mode (e.g., inside the guest OS kernel) is not secure because the attacker may operate at the same privilege level as threat protection logic. Another threat protection component is needed to enhance security of a computing device.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1A:
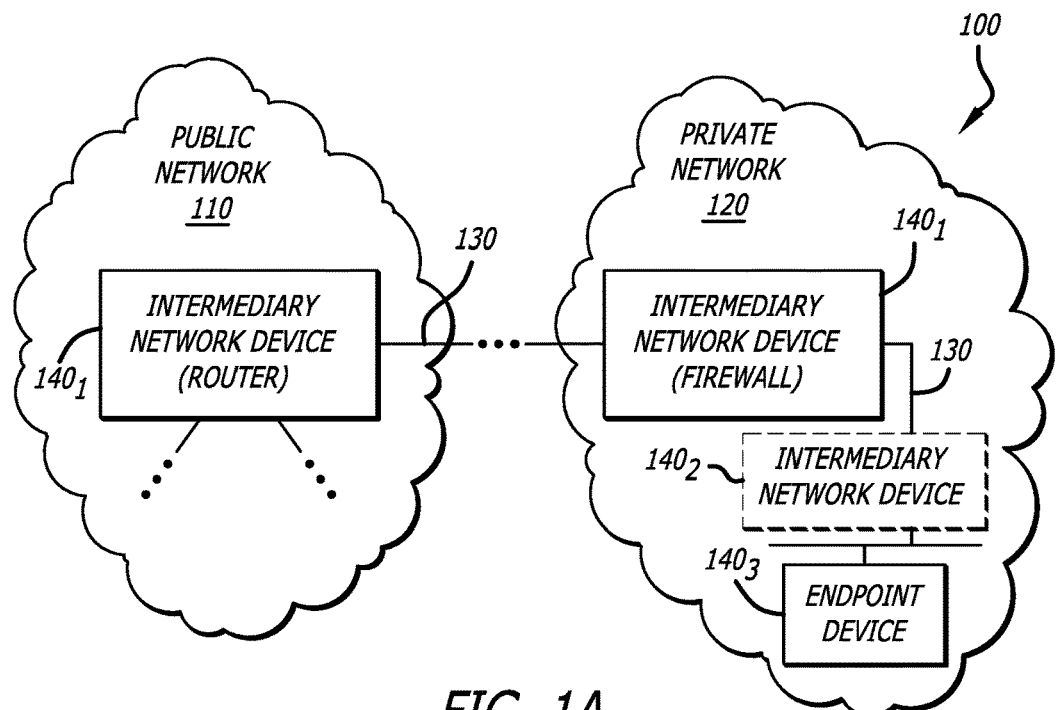
FIG. 1A is an exemplary block diagram of a system network that may be utilized by a computing device configured to support virtualization with enhanced security.

Various embodiments of the disclosure are directed to an improved architecture for detecting and classifying malware within a computing device, especially computing devices that support virtualization. For an endpoint device, the virtualization architecture features a guest environment and a host environment. The guest environment includes one or more virtual machines (VMs) controlled by a guest operating system (OS). The host environment includes a threat detection system that comprises a guest monitor process and a threat protection process. The guest monitor process is configured to manage execution of the guest OS within the VM and receives information from the virtualization hardware about monitored events in the guest OS for processing within the host environment. Additionally, the guest agent process is configured to monitor, perhaps on a continuous basis, for the presence of malicious activity inside a virtual machine. The presence of malicious activity may be detected from events that occur inside the virtual machine during its execution. The threat protection process is configured, based on receipt of events detected during VM execution, to classify the object (or event) under analysis within the VM as benign, suspicious, or malicious.

More specifically, the threat detection system is deployed within memory of the computing device as part of a virtualization layer. The virtualization layer is a logical representation of at least a portion of the host environment, which includes a light-weight hypervisor (sometimes referred herein as a "micro-hypervisor") operating at highest privilege level (e.g., ring "0"). In general, the micro-hypervisor operates in a manner similar to a host kernel. The host environment further includes a plurality of software components, which generally operate as user-level virtual machine monitors (VMMs) by providing host functionality but operating at a lower privilege level (e.g. privilege ring "3") than the micro-hypervisor.

For this architecture, according to one embodiment of the disclosure, a software component (sometimes referred to as a "guest agent") may be instrumented as part of or for operation in conjunction with an application running in the VM or the guest OS (e.g., guest OS kernel). While an object is virtually processed within the VM, a guest agent process monitors events that are occurring and stores metadata associated with these events. The metadata includes information that enhances the understanding of a particular operation being conducted and particular aspects of certain data processed during this operation (e.g., origin of the data, relationship with other data, operation type, etc.).

Provided to the threat detection system (e.g. at least guest monitor process and threat protection process) in real-time or subsequently after detection of the events, the metadata assists the threat protection process in (1) determining that anomalous behaviors associated with the detected events received from the guest agent process indicate a presence of malware within the object and (2) classifying the object associated with the detected events as being part of a malicious attack (and perhaps identifying that the object is associated with a particular malware type).

As another embodiment of the disclosure, multiple (two or more) virtual machines may be deployed to operate within a computing device (e.g., MDS appliance) for detecting malware. Each of the virtual machines may be controlled by an operating system (OS) of a same or different OS-type and/or version type. For instance, a first virtual machine may be controlled by a WINDOWS® based OS while a second virtual machine may be controlled by a LINUX® based OS.

Corresponding to the number of VMs, multiple (two or more) threat detection systems may be deployed within the host environment. Each threat detection system operates in concert with a corresponding guest monitor and a corresponding guest agent process for detecting malware. According to one embodiment of the disclosure, one instance of the guest monitor component and one instance of the threat protection component is implemented for each VM.

As described below, a different threat protection process (and perhaps the same or different guest monitor process) may uniquely correspond to one of the multiple VMs. To maintain isolation between software components associated with different processes running in the virtualization software architecture, each software component associated with one of the multiple threat protection processes may be assigned a memory address space that is isolated from and different than the memory address space assigned to the software component of another one of the threat protection processes. Additionally, each software component associated with one of the multiple guest monitor processes may be assigned to a memory address space that is isolated from and different than the memory address space assigned to the software component of another one of the guest monitor processes or another threat protection software component.

I. Terminology

In the following description, certain terminology is used to describe features of the invention. For example, in certain situations, the terms "component" and "logic" are representative of hardware, firmware or software that is configured to perform one or more functions. As hardware, a component (or logic) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

A component (or logic) may be software in the form of a process or one or more software modules, such as executable code in the form of an executable application, an API, a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage. Upon execution of an instance of a system component or a software module, a "process" performs operations as coded by the software component or software module.

The term "object" generally refers to a collection of data, whether in transit (e.g., over a network) or at rest (e.g., stored), often having a logical structure or organization that enables it to be classified for purposes of analysis for malware. During analysis, for example, the object may exhibit certain expected characteristics (e.g., expected internal content such as bit patterns, data structures, etc.) and, during processing, a set of expected behaviors. The object may also exhibit unexpected characteristics and a set of unexpected behaviors that may offer evidence of the presence of malware and potentially allow the object to be classified as part of a malicious attack.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may, according to one embodiment, include packets, frames, or cells. Further, an "object" may also refer to individual or a number of packets carrying related payloads, e.g., a single webpage received over a network. Moreover, an object may be a file retrieved from a storage location over an interconnect.

As a self-contained element, the object may be an executable (e.g., an application, program, segment of code, dynamically link library "DLL", etc.) or a non-executable. Examples of non-executables may include a document (e.g., a Portable Document Format "PDF" document, Microsoft® Office® document, Microsoft® Excel® spreadsheet, etc.), an electronic mail (email), downloaded web page, or the like.

The term "event" should be generally construed as an activity that is conducted by a software component running on the computing device. The event may occur that causes an undesired action to occur, such as overwriting a buffer, disabling a certain protective feature in the guest environment, or a guest OS anomaly such as a guest OS kernel trying to execute from a user page. Generically, an object or event may be referred to as "data under analysis".

The term "computing device" should be generally construed as electronics with the data processing capability and/or a capability of connecting to any type of network, such as a public network (e.g., Internet), a private network (e.g., a wireless data telecommunication network, a local area network "LAN", etc.), or a combination of networks. Examples of a computing device may include, but are not limited or restricted to, the following: an endpoint device (e.g., a laptop, a smartphone, a tablet, a desktop computer, a netbook, a medical device, or any general-purpose or special-purpose, user-controlled electronic device configured to support virtualization); a server; a mainframe; a router; or a security appliance that includes any system or subsystem configured to perform functions associated with malware detection and may be communicatively coupled to a network to intercept data routed to or from an endpoint device.

The term "malware" may be broadly construed as information, in the form of software, data, or one or more commands, that are intended to cause an undesired behavior upon execution, where the behavior is deemed to be "undesired" based on customer-specific rules, manufacturer-based rules, and any other type of rules formulated by public opinion or a particular governmental or commercial entity. This undesired behavior may operate as an exploit or may feature a communication-based anomaly or an execution-based anomaly that would (1) alter the functionality of an electronic device executing an application software in a malicious manner; (2) alter the functionality of an electronic device executing that application software without any malicious intent; and/or (3) provide an unwanted functionality which is generally acceptable in other context.

The term "interconnect" may be construed as a physical or logical communication path between two or more computing platforms. For instance, the communication path may include wired and/or wireless transmission mediums. Examples of wired and/or wireless transmission mediums may include electrical wiring, optical fiber, cable, bus trace, a radio unit that supports radio frequency (RF) signaling, or any other wired/wireless signal transfer mechanism.

The term "computerized" generally represents that any corresponding operations are conducted by hardware in combination with software and/or firmware. Also, the term "agent" should be interpreted as a software component that instantiates a process running in a virtual machine. The agent may be instrumented into part of an operating system (e.g., guest OS) or part of an application (e.g., guest software application). The agent is configured to provide metadata to a portion of the virtualization layer, namely software that virtualizes certain functionality supported by the computing device.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Network Architecture

Referring to FIG. 1A, an exemplary block diagram of a system network 100 that may be utilized by a computing device that is configured to support virtualization is described herein. The system network 100 may be organized as a plurality of networks, such as a public network 110 and/or a private network 120 (e.g., an organization or enterprise network). According to this embodiment of system network 100, the public network 110 and the private network 120 are communicatively coupled via network interconnects 130 and intermediary computing devices $140_1$, such as network switches, routers and/or one or more malware detection system (MDS) appliances (e.g., intermediary computing device $140_2$) as described in co-pending U.S. Patent Application entitled "Microvisor-Based Malware Detection Appliance Architecture" (U.S. patent application Ser. No. 14/962,497), the entire contents of which are incorporated herein by reference. The network interconnects 130 and intermediary computing devices $140_1$, inter alia, provide connectivity between the private network 120 and a computing device $140_3$, which may be operating as an endpoint device for example.

The computing devices $140_i$ (i=1,2,3) illustratively communicate by exchanging messages (e.g., packets or data in a prescribed format) according to a predefined set of protocols, such as the Transmission Control Protocol/Internet Protocol (TCP/IP). However, it should be noted that other protocols, such as the HyperText Transfer Protocol Secure (HTTPS) for example, may be used with the inventive aspects described herein. In the case of private network 120, the intermediary computing device $140_1$ may include a firewall or other computing device configured to limit or block certain network traffic in an attempt to protect the endpoint devices $140_3$ from unauthorized users.

Figure 1B:
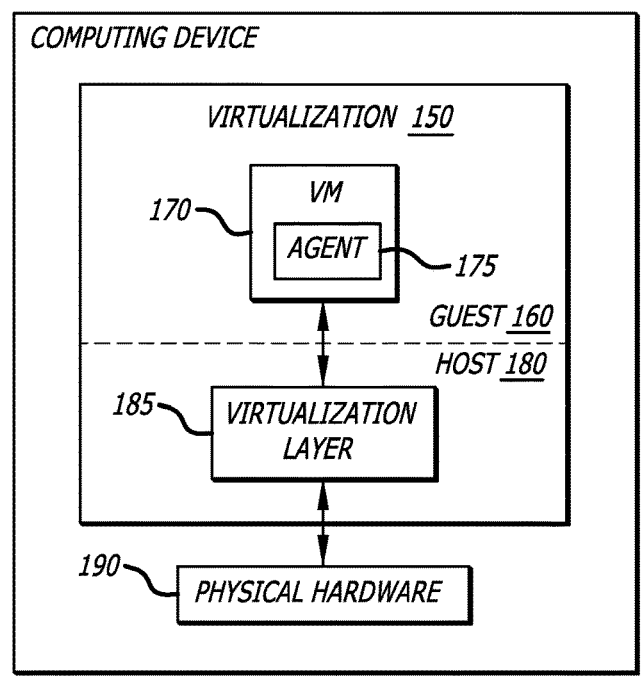
FIG. 1B is a high-level exemplary block diagram of a logical representation of the computing device of FIG. 1A.

As illustrated in FIG. 1B in greater detail, a computing device features a virtualization software architecture 150 that comprises a guest environment 160 and a host environment 180. As shown, the guest environment 160 comprises at least one virtual machine 170 (referred to herein as "VM 170"). Certain components operating within the VM 170, which is sometimes referred to as a "guest agent" 175, may be configured to monitor and store metadata (e.g., state information, memory accesses, process names, etc.) and subsequently provide the metadata to a virtualization layer 185 deployed within the host environment 180.

The virtualization layer 185 features a micro-hypervisor with access to physical hardware 190 and one or more host applications with processes running in the user space (not shown). Some of the processes, operating in concert with the guest agent 175, are responsible for determining, based on results from static, heuristic and dynamic analysis of an object in the VM 170, whether the object should be classified as malware or not. Additionally, the guest agent 175, when configured to monitor operations within the guest operating system (OS) as well as operate in concert with malware distribution modules or drivers in the guest OS kernel, may determine whether an event in the guest OS should be classified as malicious or not. Thereafter, the classification results would be subsequently reported to the intermediary network device $140_2$ or another computing device (e.g., an endpoint device controlled by a network administrator).

It is noted that the virtualization software architecture of the MDS appliance $140_2$ of FIG. 1A, which is not shown in detail but represented by an ellipsis, features a guest environment and a host environment as described above. One difference, however, is that the guest environment 160 comprises a plurality of virtual machines, where each virtual machine (VM) executes a guest operating system (OS) kernel of a different OS type, which is responsible for controlling emulation or pass-through hardware of the VM 170. For example, a first VM may feature a guest (WIN- DOWS®) OS kernel while a second VM may feature a guest (LINUX®) OS kernel. As another example, the first VM may feature a guest (WINDOWS® version "x") OS kernel while the second VM may feature a guest (WINDOWS® version "y") OS kernel, but WINDOWS® OS version "y" features major code changes from WINDOWS® OS version "x".

As deployed within the MDS appliance $140_2$, the virtualization layer 185 features a micro-hypervisor with access to the physical hardware 190 and one or more host applications running in the user space as described above. However, some of the host applications, namely the guest monitor component and the threat protection component, are implemented with multiple versions so that there exists a threat protection process (and perhaps a guest monitor process) for each OS type or each OS instance. For example, where a first VM features a guest (WINDOWS®) OS kernel and a second VM features a guest (LINUX®) OS kernel, the host environment may be implemented with (1) a first threat detection system (e.g., first guest monitor process and first threat protection process) that is responsible for classifying data under analysis (object/event) within the first VM and (2) a second threat detection system (e.g., second guest monitor process and second threat protection process) that is responsible for classifying data under analysis (object or event) within the second VM. The second threat protection process is different than the first threat protection process.

III. General Endpoint Architecture

Figure 2:
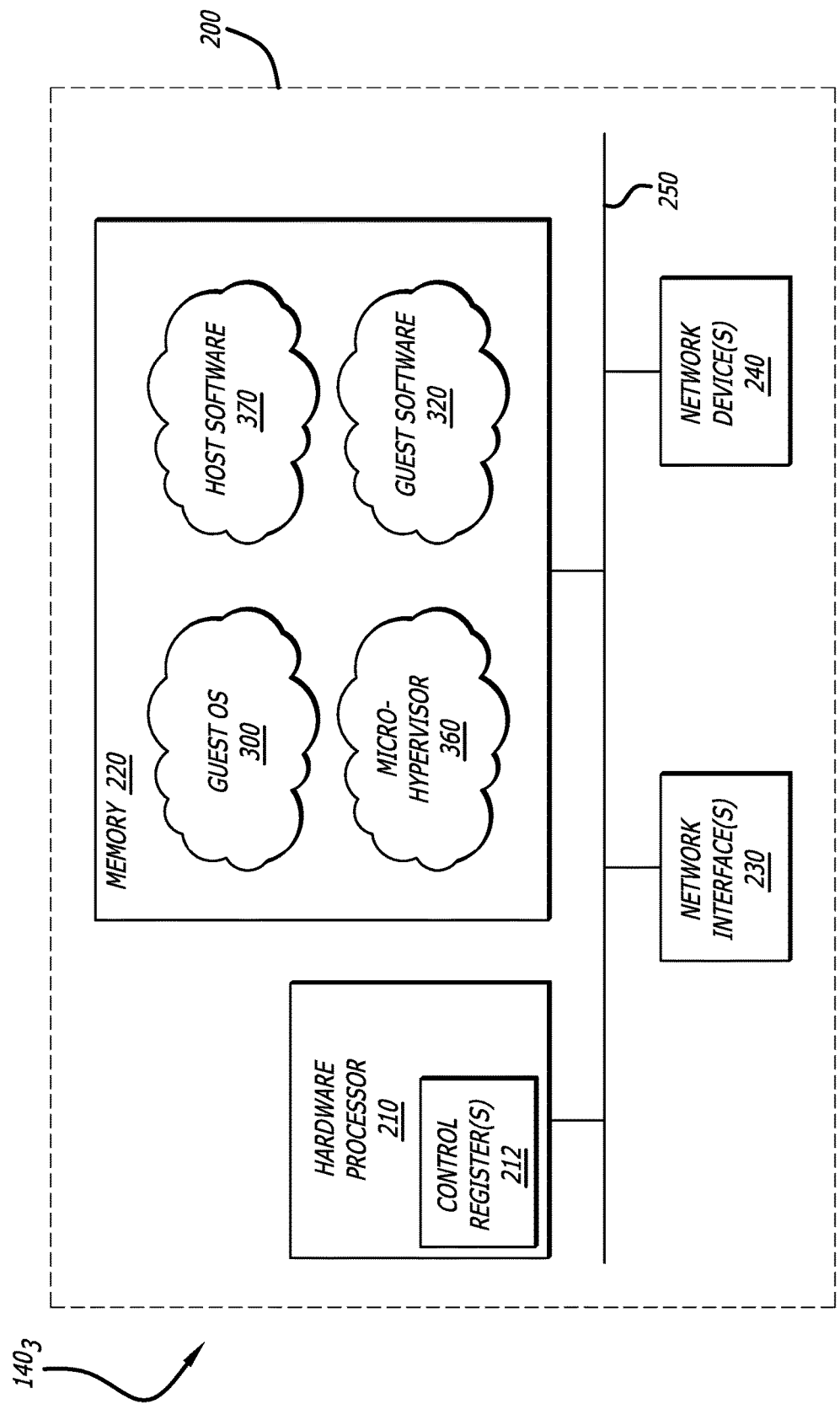
FIG. 2 is an exemplary block diagram of a physical representation of the endpoint device of FIG. 1B.

Referring now to FIG. 2, an exemplary block diagram of a physical representation of the endpoint device $140_3$ that supports virtualization is shown. Herein, the endpoint device $140_3$ illustratively includes at least one hardware processor 210, a memory 220, one or more network interfaces (referred to as "network interface(s)") 230, and one or more network devices (referred to as "network device(s)") 240 connected by a system interconnect 250, such as a bus. These components are at least partially encased in a housing 200, which is made entirely or partially of a rigid material (e.g., hardened plastic, metal, glass, composite, or any combination thereof) that protects these components from atmospheric conditions.

The hardware processor 210 is a multipurpose, programmable device that accepts digital data as input, processes the input data according to instructions stored in its memory, and provides results as output. One example of the hardware processor 210 may include an Intel® x86 central processing unit (CPU) with an instruction set architecture. Alternatively, the hardware processor 210 may include another type of CPU, a digital signal processor (DSP), an ASIC, or the like.

According to one implementation, the hardware processor 210 may include one or more control registers, including a "CR3" control register in accordance with x86 processor architectures. Herein, the CR3 register 212 may be context-switched between host mode and guest mode. Hence, when the hardware processor 210 is executing in guest mode, a pointer value within the CR3 register identifies an address location for active guest page tables, namely guest page tables associated with a currently running process that is under control of the guest OS (e.g., WINDOWS®-based process). The guest page tables are accessed as part of a two-step memory address translation to load/store requested data from/into actual physical memory.

The network device(s) 240 may include various input/output (I/O) or peripheral devices, such as a storage device for example. One type of storage device may include a solid state drive (SSD) embodied as a flash storage device or other non-volatile, solid-state electronic device (e.g., drives based on storage class memory components). Another type of storage device may include a hard disk drive (HDD). Each network interface 230 may include one or more network ports containing the mechanical, electrical and/or signaling circuitry needed to connect the endpoint device $140_3$ to the network 120 to thereby facilitate communications over the system network 110. To that end, the network interface(s) 230 may be configured to transmit and/or receive messages using a variety of communication protocols including, inter alia, TCP/IP and HTTPS.

The memory 220 may include a plurality of locations that are addressable by the hardware processor 210 and the network interface(s) 230 for storing software (including software applications) and data structures associated with such software. Examples of the stored software include a guest operating system (OS) kernel 301, guest software (applications and/or agent) 320, a micro-hypervisor 360 and host software 370, as shown in FIG. 2.

Herein, the host software 370 may include a component (e.g., instances of user-space applications operating as user-level VMMs) which, when executed, produces processes running in the host environment 180 (sometimes referred to as "hyper-processes"). The different components of the host software 370 are isolated from each other and run in separate (host) address spaces. In communication with the micro-hypervisor 360, the resulting hyper-processes are responsible for controlling operability of the endpoint device $140_3$, including policy and resource allocation decisions, maintaining logs of monitored events for subsequent analysis, managing virtual machine (VM) execution, and managing malware detection and classification. The management of malware detection and classification may be accomplished through certain host software 370 (e.g., guest monitor and threat protection components).

The micro-hypervisor 360 is disposed or layered beneath the guest OS kernel(s) 300 of the endpoint device $140_3$ and is the only component that runs in the most privileged processor mode (host mode, ring-0). As part of a trusted computing base of most components in the computing platform, the micro-hypervisor 360 is configured as a lightweight hypervisor (e.g., less than 10K lines of code), thereby avoiding inclusion of potentially exploitable x86 virtualization code.

The micro-hypervisor 360 generally operates as the host kernel that is devoid of policy enforcement; rather, the micro-hypervisor 360 provides a plurality of mechanisms that may be used by the hyper-processes, namely processes produced by execution of certain host software 370 for controlling operability of the virtualization architecture. These mechanisms may be configured to control communications between separate protection domains (e.g., between two different hyper-processes), coordinate thread processing within the hyper-processes and virtual CPU (vCPU) processing within the VM 170, delegate and/or revoke hardware resources, and control interrupt delivery and DMA, as described below.

The guest OS 300, portions of which are resident in memory 220 and executed by the hardware processor 210, functionally organize the endpoint device $140_3$ by, inter alia, invoking operations in support of guest applications executing on the endpoint device $140_3$. An exemplary guest OS 300 may include, but are not limited or restricted to the following: (1) a version of a WINDOWS® series of operating system; (2) a version of a MAC OS® or an IOS® series of operating system; (3) a version of a LINUX® operating system; or (4) a versions of an ANDROID® operating system, among others.

Guest software 320 may constitute instances of one or more guest applications running their separate guest address spaces (sometimes referred to as "user mode processes"). Examples of these guest applications may include a Portable Document Format (PDF) reader application such as ADOBE® READER® or a data processing application such as the MICROSOFT® WORD® program. Events (monitored behaviors) of an object that is processed by particular guest software 320 are monitored by a guest agent process instrumented as part of the guest OS 300 or as one of the separate guest application. The guest agent processes provides metadata to at least one of the hyper-processes and the micro-hypervisor 360 for use in malware detection.

IV. Virtualized Architecture—Endpoint Device

Figure 3:
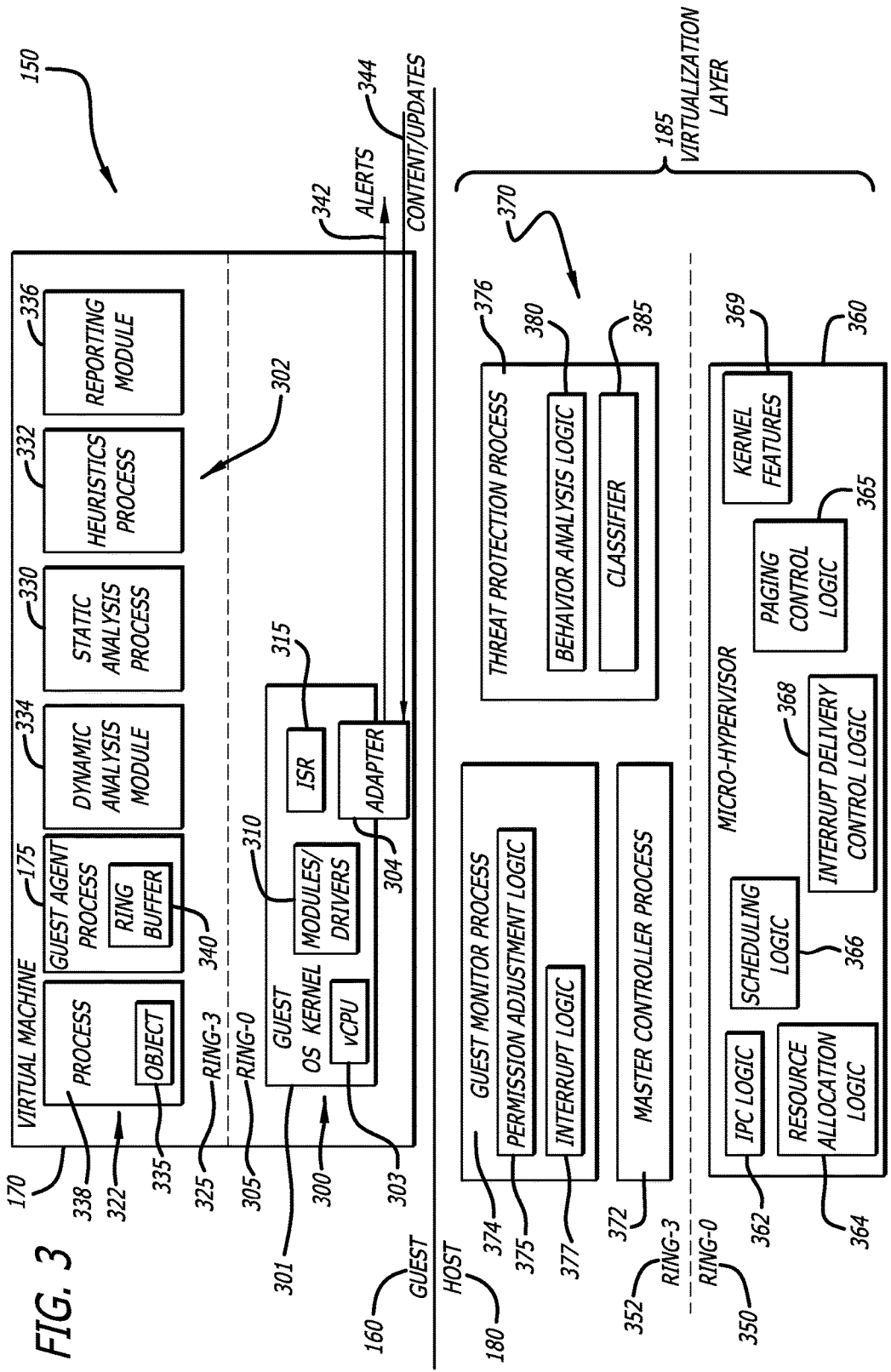
FIG. 3 is an exemplary embodiment of the virtualized architecture of the endpoint device of FIG. 1B.

Referring now to FIG. 3, an exemplary embodiment of the virtualization software architecture 150 of the endpoint device 140₃ with enhanced security of processes and/or components residing in a virtual machine is shown. The virtualization software architecture 150 comprises guest environment 160 and host environment 180, both of which may be configured in accordance with a protection ring architecture as shown. While the protection ring architecture is shown for illustrative purposes, it is contemplated that other architectures that establish hierarchical privilege levels for virtualized software components may be utilized.

A. Guest Environment

The guest environment 160 comprises a virtual machine 170, which includes software components that are configured to (i) determine whether the object 335, which is part of a guest software application or guest OS kernel, may include malware, or (ii) determine whether events that occur during operation of the guest OS are malicious. Herein, as shown, the virtual machine 170 comprises a guest OS 300 that features a guest OS kernel 301 running in the most privileged level (Ring-0 305) along with one or more processes 322, namely instance(s) of one or more guest OS applications and/or one or more instances of guest software application (hereinafter "guest software 320"), is running in a lesser privileged level (Ring-3 325). It is contemplated that malware detection on the endpoint device 140₃ may be conducted by one or more processes running in the virtual machine 170. These processes include a static analysis process 330, a heuristics process 332 and a dynamic analysis process 334, which collectively operate to detect suspicious and/or malicious behaviors by the object 335 during execution within the virtual machine 170. Notably, the endpoint device 140₃ may perform (implement) malware detection as background processing (i.e., minor use of endpoint resources) with data processing being implemented as its primary processing (e.g., in the foreground having majority use of endpoint resources).

Although not shown, it is contemplated that the object 335, which may include malware, may be processed in the guest OS kernel 301 in lieu of one of the guest processes 322. For instance, the same functionality that is provided by different malware detection processes may also be provided by different malware detection modules or drivers in the guest OS kernel 301. Hence, malware detection within the OS guest kernel 301 and inter-communications with the threat protection 376 may be conducted.

As used herein, the object 335 may include, for example, a web page, email, email attachment, file or universal resource locator. Static analysis may conduct a brief examination of characteristics (internal content) of the object 335 to determine whether it is suspicious, while dynamic analysis may analyze behaviors associated with events that occur during virtual execution of the object 335. One of these anomalous behaviors, for example, may be detected via an extended page table (EPT) violation where the object 335 attempts to access a memory page that is protected by nested page tables (i.e., page tables accessed in the second stage of the two-step memory address translation) to perform an operation that is not permitted (e.g., write data to a page that is "write protected"—namely the page without write "w" permission or execution from a page that is marked as non-executable in the nested page tables). These events are further made available to the threat protection process 376, as described below.

According to one embodiment of the disclosure, the static analysis process 330 and the heuristics process 332 may conduct a first examination of the object 335 to determine whether it is suspicious and/or malicious. The static analysis process 330 and the heuristics process 332 may employ statistical analysis techniques, including the use of vulnerability/exploit signatures and heuristics, to perform non-behavioral analysis in order to detect anomalous characteristics (i.e., suspiciousness and/or maliciousness) without execution (i.e., monitoring run-time behavior) of the object 335. For example, the static analysis process 330 may employ signatures (referred to as vulnerability or exploit "indicators") to match content (e.g., bit patterns) of the object 335 with patterns of the indicators in order to gather information that may be indicative of suspiciousness and/or maliciousness. The heuristics module 332 may apply rules and/or policies to detect anomalous characteristics of the object 335 in order to identify whether the object 335 is suspect and deserving of further analysis or whether it is non-suspect (i.e., benign) and not in need of further analysis. These statistical analysis techniques may produce static analysis results (e.g., identification of communication protocol anomalies and/or suspect source addresses of known malicious servers) that may be provided to the threat protection process 376 and/or reporting module 336.

More specifically, the static analysis process 330 may be configured to compare a bit pattern of the object 335 content with a "blacklist" of suspicious exploit indicator patterns. For example, a simple indicator check (e.g., hash) against the hashes of the blacklist (i.e., exploit indicators of objects deemed suspicious) may reveal a match, where a score may be subsequently generated (based on the content) by the threat protection process 376 to identify that the object may include malware. In addition to or in the alternative of a blacklist of suspicious objects, bit patterns of the object 335 may be compared with a "whitelist" of permitted bit patterns.

The dynamic analysis process 334 may conduct an analysis of the object 335 during processing by a guest application process 338, where the guest agent process 175 monitors and captures the run-time behaviors of the object 335. The behaviors (events) are stored within a ring buffer 340 of the guest agent 175 for subsequent analysis by the threat protection process, as described below. In an embodiment, the dynamic analysis process 334 may operate concurrently with the static analysis process 330 and/or heuristic process 332 instead of waiting for results from the static analysis process 330 and/or the heuristics process 332. During processing of the object 335, certain events may trigger page table violations that result in a VM Exit to the host environment 180 for further analysis by the threat protection process 376.

For instance, the dynamic analysis process 334 may examine whether any behaviors associated with a detected event that occur during processing of the analyzed object 335 are suspicious and/or malicious. A finding of "suspicious" denotes that the behaviors signify a first probability range of the analyzed object 335 being associated with malware while a finding of "malicious" denotes that the behaviors signify a higher second probability of the analyzed object 335 being associated with malware. The dynamic analysis results (and/or events caused by the processing of the object 335) may also be provided to reporting module 336.

Based on analysis for the threat protection process 376 based on the static analysis results and/or the dynamic analysis results, the reporting module 336 may be configured to generate a report (result data in a particular format) or an alert (message advising of the detection suspicious or malicious events) for transmission to a remotely located computing device, such as MDS appliance $140_2$ or another type of computing device.

In addition or in lieu of analysis of the object 335, it is contemplated that the presence of a guest OS anomaly, which may be detected by malware detection processes 302 or malware detection modules/drivers 310 in the guest OS kernel 301, may be detected and reported to the host environment 180 (e.g., guest monitor component 374 and/or threat protection component 376) and/or reporting module 336).

1. Guest OS

In general, the guest OS 300 manages certain operability of the virtual machine 170, where some of these operations are directed to the execution and allocation of virtual resources involving network connectivity, memory translation, and interrupt service delivery and handling. More specifically, the guest OS 300 may receive an input/output (I/O) request from the object 335 being processed by one or more guest process(es) 322, and in some cases, translates the I/O request into instructions. These instructions may be used, at least in part, by virtual system hardware (e.g., vCPU 303) to drive one or more network devices, such as a network adapter 304 for establishing communications with other network devices. Upon establishing connectivity with the private network 120 and/or the public network 110 of FIG. 1A and in response to detection of the object 335 (or monitored event) being malicious, the endpoint device $140_3$ may initiate alert messages 342 via reporting module 336 and the network adapter 304. The alerts may be in any prescribed a message format (e.g., a Short Message Service "SMS" message, Extended Message Service "EMS" message, Multimedia Messaging Service "MMS", Email, etc.) or any other prescribed wired or wireless transmission format. Additionally, the guest OS 300 may receive software updates 344 from administrators via the private network 120 of FIG. 1A or from a third party provider via the public network 110 of FIG. 1A.

Another operation supported by the guest OS 300 involves the management of guest page tables, which are used as part of the two-step memory address translation where a guest-linear address (GLA) is translated to a guest-physical address (GPA).

Lastly, the guest OS kernel 301 is configured with an Interrupt Service Routine (ISR) 315 that supports one or more different types of interrupts, including network-based interrupts, graphics-based interrupts and kernel services interrupts. Since the guest agent process 175 may be turned off or halted through malicious attack, the kernel services interrupts are invoked by the guest monitor process 374, as described below, to ensure processing of the guest agent process 175 within the VM 170.

Issued by the guest monitor process 374, a kernel services interrupt represents a virtual interrupt that causes the guest OS kernel 301 to conduct a plurality of checks. One of these checks is directed to an analysis of the operating state of the guest agent process 175 (i.e., halted, disabled, in operation, etc.). Another check may involve an evaluation of data structures associated with the guest agent process 175 or other software components within the VM 170 to determine whether such data structures have been tampered. Another check involves an evaluation of the system call table (not shown) to determine if entry points for any of the system calls have been maliciously changed.

2. Guest Agent

According to one embodiment of the disclosure, the guest agent process 175 is based on a software component configured to provide the virtualization layer 185 with metadata that may assist in the handling of malware detection. Instrumented in either a guest application 320, guest OS 300, or operating as a separate module, the guest agent is configured to provide metadata to the virtualization layer 185 in response to at least one selected event.

Herein, the guest agent process 175 utilizes one or more ring buffers 340 (e.g., queue, FIFO, buffer, shared memory, and/or registers), which records certain events that may be considered of interest for malware detection. Examples of these events may include information associated with a newly created process (e.g., process identifier, time of creation, originating source for creation of the new process, etc.), information associated with an access to certain restricted port or memory address, or the like. The recovery of the information associated with the stored events may occur through a "pull" or "push" recovery scheme, where the guest agent process 175 may be configured to download the metadata periodically or aperiodically (e.g., when the ring buffer 340 exceeds a certain storage level or in response to a request). The request may originate from the threat protection process 376 and is generated by the guest monitor process 374.

B. Host Environment

As further shown in FIG. 3, the host environment 170 features a protection ring architecture that is arranged with a privilege hierarchy from the most privileged level 350 (Ring-0) to a lesser privilege level 352 (Ring-3). Positioned at the most privileged level 350 (Ring-0), the micro-hypervisor 360 is configured to directly interact with the physical hardware platform and its resources, such as hardware processor 210 or memory 220 of FIG. 2.

Running on top of the micro-hypervisor 360 in Ring-3 352, a plurality of processes being instances of certain host software 370 (referred to as "hyper-processes") communicate with the micro-hypervisor 360. Some of these hyper-processes 370 include master controller process 372, guest monitor process 374 and threat protection process 376. Each of these hyper-processes 372, 374 and 376 represents a separate software component with different functionality and is running in a separate address space. As the software components associated with the hyper-processes are isolated from each other (i.e. not in the same binary), inter-process communications between the hyper-processes are handled by the micro-hypervisor 360, but regulated through policy protection by the master controller process 372.

1. Micro-Hypervisor

The micro-hypervisor 360 may be configured as a lightweight hypervisor (e.g., less than 10K lines of code) that operates as a host OS kernel. The micro-hypervisor 360 features logic (mechanisms) for controlling operability of the computing device, such as endpoint device $140_3$, as shown. The mechanisms include inter-process communication (IPC) logic 362, resource allocation logic 364, scheduling logic 366 and interrupt delivery control logic 368, where all of these mechanisms are based, at least in part, on a plurality of kernel features—protection domains, execution contexts, scheduling contexts, portals, and semaphores (hereinafter collectively as "kernel features 369") as partially described in a co-pending U.S. Patent Application entitled "Microvisor-Based Malware Detection Endpoint Architecture" (U.S. patent application Ser. No. 14/929,821), the entire contents of which are incorporated herein by reference.

More specifically, a first kernel feature is referred to as "protection domains," which correspond to containers where certain resources for the hyper-processes can be assigned, such as various data structures (e.g., execution contexts, scheduling contexts, etc.). Given that each hyper-process 370 corresponds to a different protection domain, code and/or data structures associated with a first hyper-process (e.g., master controller process 372) is spatially isolated (within the address space) from a second (different) hyper-process (e.g., guest monitor process 374). Furthermore, code and/or data structures associated with any of the hyper-processes are spatially isolated from the virtual machine 170 as well.

A second kernel feature is referred to as an "execution context," which features thread level activities within one of the hyper-processes (e.g., master controller process 372). These activities may include, inter alia, (i) contents of hardware registers, (ii) pointers/values on a stack, (iii) a program counter, and/or (iv) allocation of memory via, e.g., memory pages. The execution context is thus a static view of the state of a thread of execution.

Accordingly, the thread executes within a protection domain associated with that hyper-process of which the thread is a part. For the thread to execute on a hardware processor 210, its execution context may be tightly linked to a scheduling context (third kernel feature), which may be configured to provide information for scheduling the execution context for execution on the hardware processor 210. Illustratively, the scheduling context may include a priority and a quantum time for execution of its linked execution context on the hardware processor 210.

Hence, besides the spatial isolation provided by protection domains, the micro-hypervisor 360 enforces temporal separation through the scheduling context, which is used for scheduling the processing of the execution context as described above. Such scheduling by the micro-hypervisor 360 may involve defining which hardware processor may process the execution context, what priority is assigned the execution priority, and the duration of such execution.

Communications between protection domains are governed by portals, which represent a fourth kernel feature that is relied upon for generation of the IPC logic 362. Each portal represents a dedicated entry point into a corresponding protection domain. As a result, if one protection domain creates the portal, another protection domain may be configured to call the portal and establish a cross-domain communication channel.

Lastly, of the kernel features 369, semaphores facilitate synchronization between execution context on the same or on different hardware processors. The micro-hypervisor 360 uses the semaphores to signal the occurrence of hardware interrupts to the user applications.

The micro-hypervisor 360 utilizes one or more of these kernel features to formulate mechanisms for controlling operability of the endpoint device 200. One of these mechanisms is the IPC logic 362, which supports communications between separate protection domains (e.g., between two different hyper-processes). Thus, under the control of the IPC logic 362, in order for a first hyper-process to communicate with another hyper-process, the first hyper-process needs to route a message to the micro-hypervisor 360. In response, the micro-hypervisor 360 switches from a first protection domain (e.g., first hyper-process 372) to a second protection domain (e.g., second hyper-process 374) and copies the message from an address space associated with the first hyper-process 372 to a different address space associated with the second hyper-process 374.

Another mechanism provided by the micro-hypervisor 360 is resource allocation logic 364. The resource allocation logic 364 enables a first software component to share one or more memory pages with a second software component under the control of the micro-hypervisor 360. Being aware of the location of one or more memory pages, the micro-hypervisor 360 provides the protection domain associated with the second software component access to the memory location(s) associated with the one or more memory pages.

Also, the micro-hypervisor 360 contains scheduling logic 366 that, when invoked, selects the highest-priority scheduling context and dispatches the execution context associated with the scheduling context. As a result, the scheduling logic 366 ensures that, at some point in time, all of the software components can run on the hardware processor 210 as defined by the scheduling context. Also, the scheduling logic 366 re-enforces that no software component can monopolize the hardware processor 210 longer than defined by the scheduling context.

Lastly, the micro-hypervisor 360 contains an interrupt delivery control logic 368 that, when driven by the micro-hypervisor 360, any interrupts that occur are also delivered to the micro-hypervisor 360.

2. Master Controller

Referring still to FIG. 3, generally operating as a root task, the master controller process 372 is responsible for enforcing policy rules directed to operations of the virtualization software architecture 150. This responsibility is in contrast to the micro-hypervisor 360, which provides mechanisms for inter-process communications and resource allocation, but does not dictate how and when such functions occur. For instance, the master controller process 372 may be configured to conduct a number of policy decisions, including some or all of the following: (1) memory allocation (e.g., distinct physical address space assigned to different software components); (2) execution time allotment (e.g., scheduling and duration of execution time allotted on a selected granular basis process basis); (3) virtual machine creation (e.g., number of VMs, OS type, etc.); and/or (4) inter-process communications (e.g., which processes are permitted to communicate with which processes, etc.).

Additionally, the master controller process 372 is responsible for the allocation of resources. Initially, the master controller process 372 receives access to most of the physical resources, except for access to security critical resources that should be driven by high privileged (Ring-0) components, not user space (Ring-3) software components such as hyper-processes. For instance, while precluded from access to the memory management unit (MMU) or the interrupt controller, the master controller process 372 may be configured to control the selection of which software components are responsible for driving certain network devices.

The master controller process 372 is platform agnostic. Thus, the master controller process 372 may be configured to enumerate what hardware is available to a particular process (or software component) and to configure the state of the hardware (e.g., activate, place into sleep state, etc.).

By separating the master controller process 372 from the micro-hypervisor 360, a number of benefits are achieved. One inherent benefit is increased security. When the functionality is placed into a single binary, which is running in host mode, any vulnerability may place the entire computing device at risk. In contrast, each of the software components within the host mode is running in its own separate address space.

3. Guest Monitor

Referring still to FIG. 3, the guest monitor process 374 is a running instance of a user space application that is responsible for managing the execution of the virtual machine 170, which includes operating in concert with the threat protection process 376 to determine whether or not certain events, detected by the guest monitor process 374 during processing of the object 335 within the VM 170, are malicious. As an example, in response to an extended page table (EPT) violation, the virtualization hardware causes a VM Exit to the virtualization layer 185. The guest monitor process 374 identifies the EPT violation as an unpermitted attempt in accessing a memory page associated with the nested page table. The occurrence of the VM Exit may prompt the guest monitor process 374 to obtain and forward metadata associated with the EPT violation (as monitored by the guest agent 175) to the threat protection process 376. Based on the metadata, the threat protection process 376 determines if the event was suspicious, malicious or benign.

As an illustrative example, it is noted that there are certain events that cause a transition of control flow from the guest mode to the host mode. The guest monitor process 374 can configure, on an event basis, which events should trigger a transition from the guest mode to the host mode. One event may involve the execution of a privileged processor instruction by the vCPU 303 within the virtual machine 170. In response to execution by the vCPU 303 of a privileged instruction, the micro-hypervisor 360 gains execution control of the endpoint device 140$_3$ and generates a message to the guest monitor process 374, which is responsible for handling the event.

The guest monitor process 374 also manages permissions of the nested page tables under control of the virtualization layer 185. More specifically, the micro-hypervisor 360 includes a mechanism (i.e. paging control logic 365) to populate the nested page tables. The guest monitor process 374 features permission adjustment logic 375 that alters the page permissions. One technique in altering the page permissions may involve selecting a particular nested page table among multiple nested page tables, which provides the same memory address translation but is set with page permissions for the targeted memory pages that differ from page permissions for other nested page tables. Some of the functionality of the permission adjustment logic 375 may be based, at least in part, on functionality within paging control logic 365 that is accessible via an API (not shown).

The guest monitor process 374 also includes interrupt logic 377, which is responsible for injecting virtual interrupts to the ISR agent 315 within the guest OS kernel 301. The virtual interrupts are intended for the ISR agent 315 to assume control over certain operations of the virtual machine 170.

4. Threat Protection Component

As described above and shown in FIG. 3, detection of a suspicious and/or malicious object 335 may be performed by static and dynamic analysis of the object 335 within the virtual machine 170. Events associated with the process are monitored and stored by the guest agent process 175. Operating in concert with the guest agent process 175, the threat protection process 376 is responsible for further malware detection on the endpoint device 140$_3$ based on an analysis of events received from the guest agent process 175 running in the virtual machine 170. It is contemplated, however, that detection of suspicious/malicious activity may also be conducted completely outside the guest environment 160, such as solely within the threat protection logic 376 of the host environment 180. The threat protection logic 376 may rely on an interaction with the guest agent process 175 when it needs to receive semantic information from inside the guest OS that the host environment 180 could not otherwise obtain itself. Examples of semantic information may identify whether malicious activity conducted within a certain page of memory is associated with a particular file, segment of code, or other another data type.

After analysis, the detected events are correlated and classified as benign (i.e., determination of the analyzed object 335 being malicious is less than a first level of probability); suspicious (i.e., determination of the analyzed object 335 being malicious is between the first level and a second level of probability); or malicious (i.e., determination of the analyzed object 335 being malicious is greater than the second level of probability). The correlation and classification operations may be accomplished by a behavioral analysis logic 380 and a classifier 385. The behavioral analysis logic 380 and classifier 385 may cooperate to analyze and classify certain observed behaviors of the object (based on events) as indicative of malware. In particular, the observed run-time behaviors by the guest agent 175 are provided to the behavioral analysis logic 380 as dynamic analysis results. These events may include metadata and other information associated with an EPT violation or any other VM Exit. Additionally, static analysis results and dynamic analysis results may be provided to the threat protection process 376 via the guest monitor process 374.

More specifically, the static analysis results and dynamic analysis results may be stored in memory 220, along with any additional metadata from the guest agent process 175. These results may be provided via coordinated IPC-based communication to the behavioral analysis logic 380. Alternatively, the results and/or events may be provided or reported via the network adapter 304 for the transmission to the MDS appliance 140$_2$ for correlation. The behavioral analysis logic 380 may be embodied as rules-based correlation logic illustratively executing as an isolated process (software component) that communicates with the guest environment 160 via the guest monitor process 374.

In an embodiment, the behavioral analysis logic 380 may be configured to operate on correlation rules that define, among other things, patterns (e.g., sequences) of known malicious events (if-then statements with respect to, e.g., attempts by a process to change memory in a certain way that is known to be malicious). The events may collectively correlate to malicious behavior. The rules of the behavioral analysis logic 380 may then be correlated against those dynamic analysis results, as well as static analysis results, to generate correlation information pertaining to, for example, a level of risk or a numerical score used to arrive at a decision of maliciousness.

The classifier 385 may be configured to use the correlation information provided by behavioral analysis logic 380 to render a decision as to whether the object 335 (or monitored events from a guest process 320 or guest OS kernel 301). Illustratively, the classifier 385 may be configured to classify the correlation information, including monitored behaviors (expected and unexpected/anomalous) and access violations relative to those of known malware and benign content.

Periodically, via the guest OS kernel 301, rules may be pushed from the MDS appliance $140_2$ or another computing device to the endpoint $140_3$ to update the behavioral analysis logic 380, where the rules may be embodied as different (updated) behaviors to monitor. For example, the correlation rules pushed to the behavioral analysis logic 380 may include, e.g., whether a running process or application program has spawned processes, requests to use certain network ports that are not ordinarily used by the application program, and/or attempts to access data in memory locations not allocated to the guest application running the object. Alternatively, the correlation rules may be pulled based on a request from an endpoint device $140_3$ to determine whether new rules are available, and in response, the new rules are downloaded.

Illustratively, the behavioral analysis logic 380 and classifier 385 may be implemented as separate modules although, in the alternative, the behavioral analysis logic 380 and classifier 385 may be implemented as a single module disposed over (i.e., running on top of) the micro-hypervisor 360. The behavioral analysis logic 380 may be configured to correlate observed behaviors (e.g., results of static and dynamic analysis) with known malware and/or benign objects (embodied as defined rules) and generate an output (e.g., a level of risk or a numerical score associated with an object) that is provided to and used by the classifier 385 to render a decision of malware based on the risk level or score exceeding a probability threshold. The reporting module 336, which execute as a user mode process (perhaps within the guest OS kernel 301), is configured to generate an alert for transmission external to the endpoint device $140_3$ (e.g., to one or more other endpoint devices, a management appliance, or MDS appliance $140_2$) in accordance with "post-solution" activity.

V. General MDS Appliance Architecture

Figure 4:
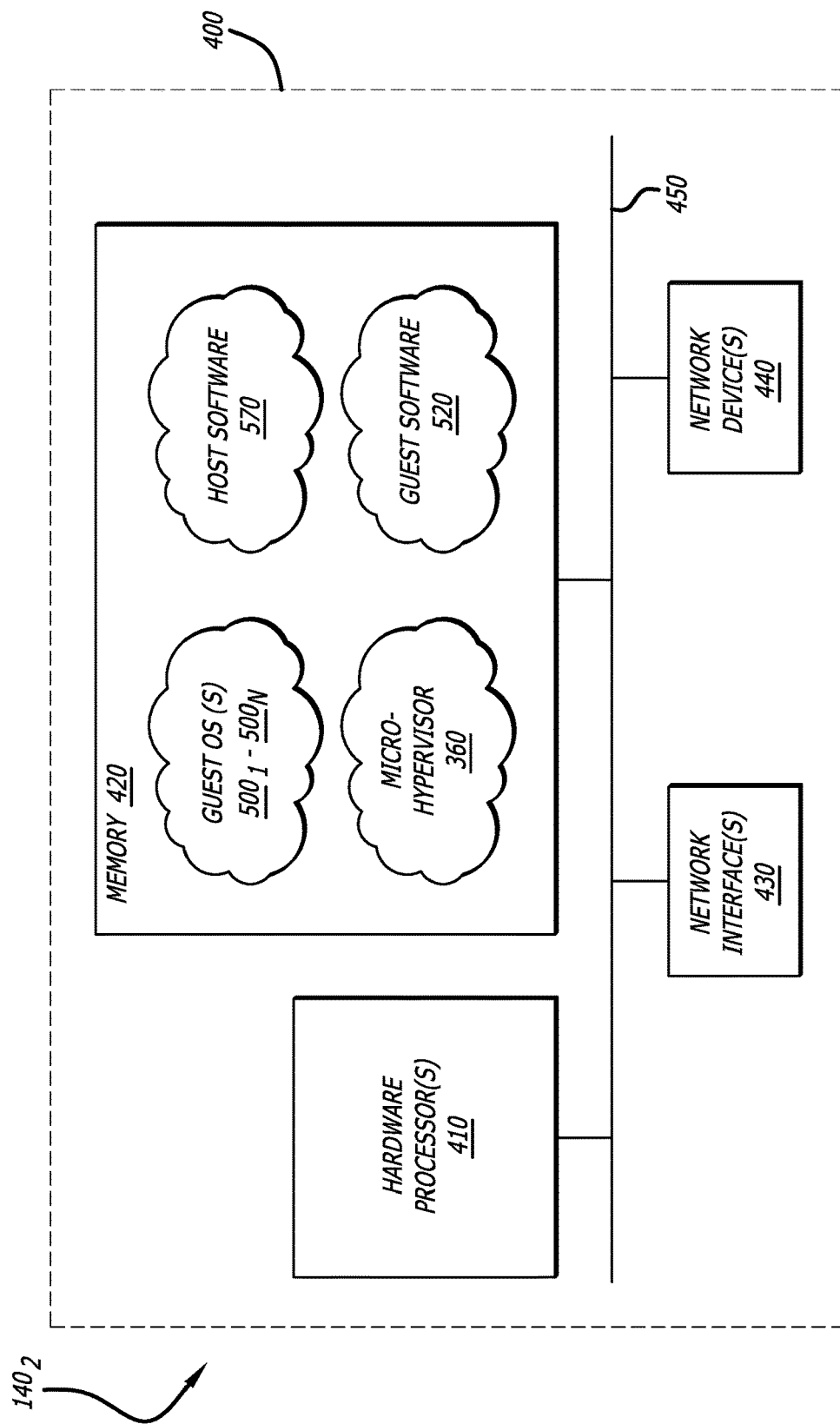
FIG. 4 is an exemplary block diagram of a physical representation of a malware detection system (MDS) appliance of FIG. 1B.

Referring now to FIG. 4, an exemplary block diagram of a physical representation of the MDS appliance $140_2$ that supports virtualization is shown. Herein, the MDS appliance $140_2$ illustratively includes one or more hardware processors 410 (referred to as "hardware processor(s)"), a memory 420, one or more network interfaces (referred to as "network interface(s)") 430, and one or more network devices (referred to as "network device(s)") 440 connected by a system interconnect 450, such as a bus. These components are at least partially encased in a housing 400, which is made entirely or partially of a rigid material (e.g., hardened plastic, metal, glass, composite, or any combination thereof) that protects these components from atmospheric conditions.

Herein, the network interface(s) 430 may feature a digital tap that is configured to copy and/or re-route data received over a network to the MDS appliance $140_2$. The network interface 430 may be implemented as part of the MDS appliance $140_2$ or as a separate standalone component operating in conjunction with the MDS appliance $140_2$. Alternatively, the MDS appliance $140_2$ may be placed in-line to process received data in real-time. It is contemplated that the MDS appliance $140_2$ may be a dedicated hardware device or dedicated software operating within a multi-operational device. Alternatively, the MDS appliance $140_2$ may be piggybacked on another network device like a firewall, switch, or gateway. As shown, the memory 420 stores a plurality of OS kernels $500_1$-$500_N$, (hereinafter referred to as "guest OS kernel(s)") and additional host software 570.

Herein, the host software 570 may include instances of user-space applications operating as user-level VMMs which, when executed, produce processes referred to as "hyper-processes. The different host software 570 is isolated from each other and run on separate physical address spaces. In communication with the micro-hypervisor 560, the resulting hyper-processes are responsible for controlling operability of the MDS appliance $140_2$, including managing malware detection and classification. Such management of malware detection and classification may be accomplished through multiple hyper-processes, each of these hyper-processes operating as a threat detection system that is responsible for malware detection and classification for a particular OS-type (e.g., features corresponding guest monitor and threat protection processes for each particular guest OS kernel).

The guest OSes $500_1$-$500_N$ (N>1), portions of which are resident in memory 520 and executed by the hardware processor 510, functionally organize the corresponding VM $170_1$-$170_N$ by, inter alia, invoking operations in support of guest applications executing within the VMs $170_1$-$170_N$. Examples of different OS types $500_1$-$500_N$ may include, but are not limited or restricted to any of the following: (1) a version of the WINDOWS® operating system; (2) a version of the MAC OS® or IOS® operating systems; (3) a version of the LINUX® operating system; and/or (4) a version of the ANDROID® operating system.

VI. Virtualized Architecture—MDS Appliance

Figure 5:
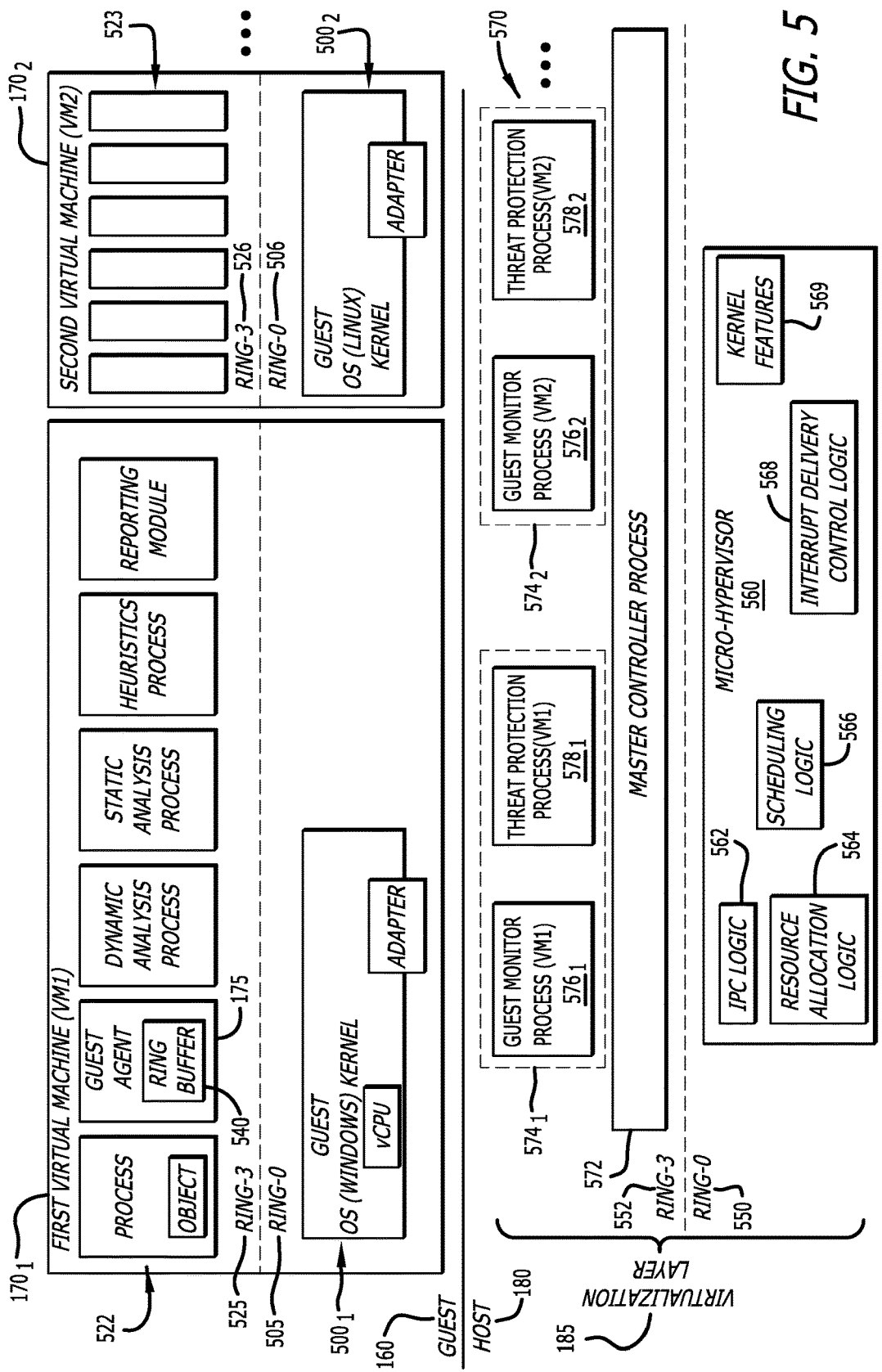
FIG. 5 is an exemplary embodiment of the virtualized architecture of the MDS appliance of FIG. 1B.

Referring now to FIG. 5, an exemplary embodiment of an improved virtualization software architecture 150 to detect and classify malware within the MDS appliance $140_2$ is shown. The virtualization software architecture 150 comprises guest environment 160 and host environment 180, both of which may be configured in accordance with a protection ring architecture as shown. While the protection ring architecture is shown for illustrative purposes, it is contemplated that other architectures that establish hierarchical privilege levels for virtualized software components may be utilized.

A. Guest Environment

As shown, the guest environment 160 comprises multiple (two or more) virtual machines $170_1$-$170_N$ (N>1), where a single virtual machine (VM) (e.g., VM $170_1$) or multiple (two or more) VMs (e.g., VMs $170_1$-$170_2$) may analyzes an object 335 for the presence of malware. As shown, a first virtual machine (VM) $170_1$ features a guest OS kernel $500_1$ of a first OS type (e.g., WINDOWS® OS) that is running in the most privileged level (Ring-0 505) along with one or more processes 522 some of which are instances of guest software 520 (hereinafter "guest application process(es)") that are running in a lesser privileged level (Ring-3 525).

As further shown, a second VM $170_2$ features a guest OS kernel $500_2$ of a second OS type (e.g., LINUX® OS) that is running in the most privileged level (Ring-0 506). Similar to process(es) 522 running on the first VM $170_1$, one or more processes 523 are running in a lesser privileged level (Ring-3 526) of the second VM $170_2$.

It is contemplated that malware detection on the MDS appliance $140_2$ may be conducted by one or more processes 522 running as part of the first VM $170_1$ and/or one or more processes 523 running as part of the second VM $170_2$. These processes 522 and 523 may operate in a similar manner, as described herein.

1. Guest OS

In general, the guest OS $500_1$ manages operability of the first VM $170_1$, where some of these operations involve network connectivity, memory translation and interrupt service delivery and handling of these incoming service requests. More specifically, the guest OS $500_1$ may receive an input/output (I/O) request from the object 335 being processed by one or more guest software process(es) 522, and in some cases, translates the I/O request into instructions. These instructions may be used, at least in part, by virtual system hardware (e.g., vCPU) to drive one or more network devices, such as a virtual network adapter (e.g., virtual network interface card "vNIC"), for establishing communications with other network devices. Upon establishing connectivity with the private network 120 and/or the public network 110 of FIG. 1A, the MDS appliance $140_2$ may initiate alert messages via a reporting module 536 and the NIC 502 in response to detection that the object 335 is malicious. Additionally, with network connectivity, the guest OS $500_1$ may receive software updates from administrators via the private network 120 of FIG. 1A or from a third party provider via the public network 110 of FIG. 1A.

Similarly, the guest OS kernel $500_2$ manages operability of the second VM $170_2$ similar to the management of the first VM 170, by the OS guest kernel $500_1$.

2. Guest Agent

According to one embodiment of the disclosure, the guest agent process 175 is based on a software component configured to provide the virtualization layer 185 with metadata that may assist in the handling of malware detection. Instrumented into guest software 520, guest OS kernel $500_1$ or operating as a separate module as shown, the guest agent process 175 is configured to provide metadata to the virtualization layer 185 in response to at least one selected event. For the second VM $170_2$, it is contemplated that another guest agent process (not shown) will operate in a similar fashion.

Each of the guest agent processes may comprise one or more ring buffers, which records certain events that may be considered of interest for malware detection, as described above. The recovery of the information associated with the stored events may be provided to a corresponding threat detection system $574_1$-$574_N$ (e.g. guest monitor process $576_1$ from the first VM $170_1$ or guest monitor process $576_2$ from the second VM $170_2$). For instance, the guest agent process 175 may be configured to download the metadata periodically or aperiodically (e.g., when the ring buffer 540 exceeds a certain storage level or in response to a request) to the guest monitor process $576_1$ for routing to the threat protection process $578_1$. Likewise, the guest agent (not shown) operating in the second VM $170_2$ may periodically or aperiodically download metadata to the guest monitor process 3762 for routing to the threat protection process $378_2$.

B. Host Environment

As further shown in FIG. 5, the host environment 170 features a protection ring architecture that is arranged with a privilege hierarchy from the most privileged level 550 (Ring-0) to a lesser privilege level 552 (Ring-3). Positioned at the most privileged level 550 (Ring-0) and interacting directly with the physical resources devices, the micro-hypervisor 560 is configured to directly interact with the physical hardware, such as hardware processor 410 or memory 420 of FIG. 4.

Running on top of the micro-hypervisor 560 in Ring-3 552, a plurality of processes being instances of certain host software 570 communicate with the micro-hypervisor 560. Some of these hyper-processes 570 include master controller component 572, and one or more threat detection systems $574_1$-$574_N$. The number of threat detection systems $574_1$-$574_N$ corresponding to the number of virtual machine $170_1$-$170_N$ for a one-to-one correspondence.

Each threat detection systems $574_1$-$574_N$ comprises guest monitor component $576_1$-$576_N$ and threat protection component $578_1$-$578_N$. According to one embodiment, each of the master controller component 572, the guest monitor components $576_1$-$576_N$ and the threat protection components $578_1$-$578_N$ are isolated from each other (i.e. separate software components with different functionality and running in a separate address space). It is contemplated, however, that the guest monitor components $576_1$-$576_N$ may be isolated from the master controller component 572 and the threat protection components $578_1$-$578_N$, but the guest monitor components $576_1$-$576_N$ share the same binary and may not be isolated from each other.

1. Micro-Hypervisor

The micro-hypervisor 560 may be configured as a lightweight hypervisor that operates as a host OS kernel and similar to micro-hypervisor 360 of FIG. 3. As described above, the micro-hypervisor 560 features logic (mechanisms) for controlling operability of the computing device, such as MDS appliance $140_2$, where these mechanisms include inter-process communication (IPC) logic 562, resource allocation logic 564, scheduling logic 566, interrupt delivery control logic 568 and kernel features 569.

2. Master Controller

Referring still to FIG. 5, similar in operation to master controller process 372 of FIG. 3, the master controller process 572 is responsible for enforcing policy rules directed to operations of the virtualization software architecture 150. For instance, the master controller component 572 may be configured to conduct a number of policy decisions, including some or all of the following: (1) memory allocation (e.g., distinct physical address space assigned to different software components); (2) execution time allotment (e.g., scheduling and duration of execution time allotted on a selected granular basis process basis); (3) virtual machine creation (e.g., number of VMs, OS type, etc.); (4) inter-process communications (e.g., which processes are permitted to communicate with which processes, etc.); and/or (5) coordination of VM operations and interactions between the components of the VMs $170_1$-$170_N$ and components within the host environment 180 for conducting threat detection.

3. Guest Monitor(S)

Referring still to FIG. 5, each guest monitor process $576_1$-$576_N$ is based on a user space application that is responsible for managing the execution of a corresponding virtual machine (e.g. first VM $170_1$), which is operating in concert with a corresponding threat protection process (e.g., threat protection process $578_1$ of threat protection processes $578_1$-$578_N$). Herein, the threat protection process $578_1$ is configured to determine whether or not certain events, received by that particular guest monitor process (e.g., guest monitor process $576_1$) during processing of the object 335 within the VM $170_1$, are malicious.

In response an extended page table (EPT) violation, which causes the virtualization hardware to generate a VM Exit to the virtualization layer 185, the guest monitor process 576₁ identifies that an unpermitted operation was attempted on a memory page associated with the nested page table. The occurrence of the VM Exit may prompt the guest monitor process 576₁ to obtain and forward metadata associated with the EPT violation (as monitored by the guest agent process 175) to the threat protection process 578₁. Based on the metadata, the threat protection component 578₁ determines if the event was malicious or not.

If the event was benign, although the page is access protected, the guest monitor process 576₁ may be responsible for emulating the attempted access. For instance, for an EPT violation triggered for a write-protection violation that is determined to be benign, the guest monitor process 576₁ would need to simulate the write access. Alternatively, the guest monitor process 576₁ could relax the page permissions (to their original permissions) and resume the VM 170₁. Then, the write access would be restarted and there would be no EPT violation anymore.

4. Threat Protection Component

As described above and shown in FIG. 5, detection of a suspicious and/or malicious object 335 may be performed by static and dynamic analysis of the object 335 within the virtual machine 170₁. Events associated with the process are monitored and stored by the guest agent process 175. Operating in concert with the guest agent process 175, the threat protection component 578₁ is responsible for further malware detection associated with an object under analysis within the first VM 170₁. This malware detection may invoke an analysis of events received from the guest agent process 175 running in the virtual machine 170₁.

During analysis, the detected events are correlated and classified as benign (i.e., determination of the analyzed object 335 being malicious is less than a first level of probability); suspicious (i.e., determination of the analyzed object 335 being malicious is between the first level and a second level of probability); or malicious (i.e., determination of the analyzed object 335 being malicious is greater than the second level of probability). The correlation and classification operations may be accomplished by behavioral analysis logic and a classifier, similar to the operations described in FIG. 3.

Operating in concert with a guest agent process (not shown), which is operating within the ring-3 privileged area 526 of the second VM 170₂, the threat protection process 578₂ is responsible for the malware detection associated with the object 335 under analysis within the second VM 170₂. The object 335 may be processed in the second VM 170₂ concurrently with the processing of the object 335 within the first VM 170₁. Alternatively, only one of the first VM 170₁ or the second VM 170₂ may process the object 335. The operations of the guest monitor process 576₂ and the threat protection process 578₂ are consistent with the operations of the guest monitor process 376₁ and the threat protection process 378₁ of FIG. 3

VII. Guest/Host Level Threat Protection Operability

Figure 6:
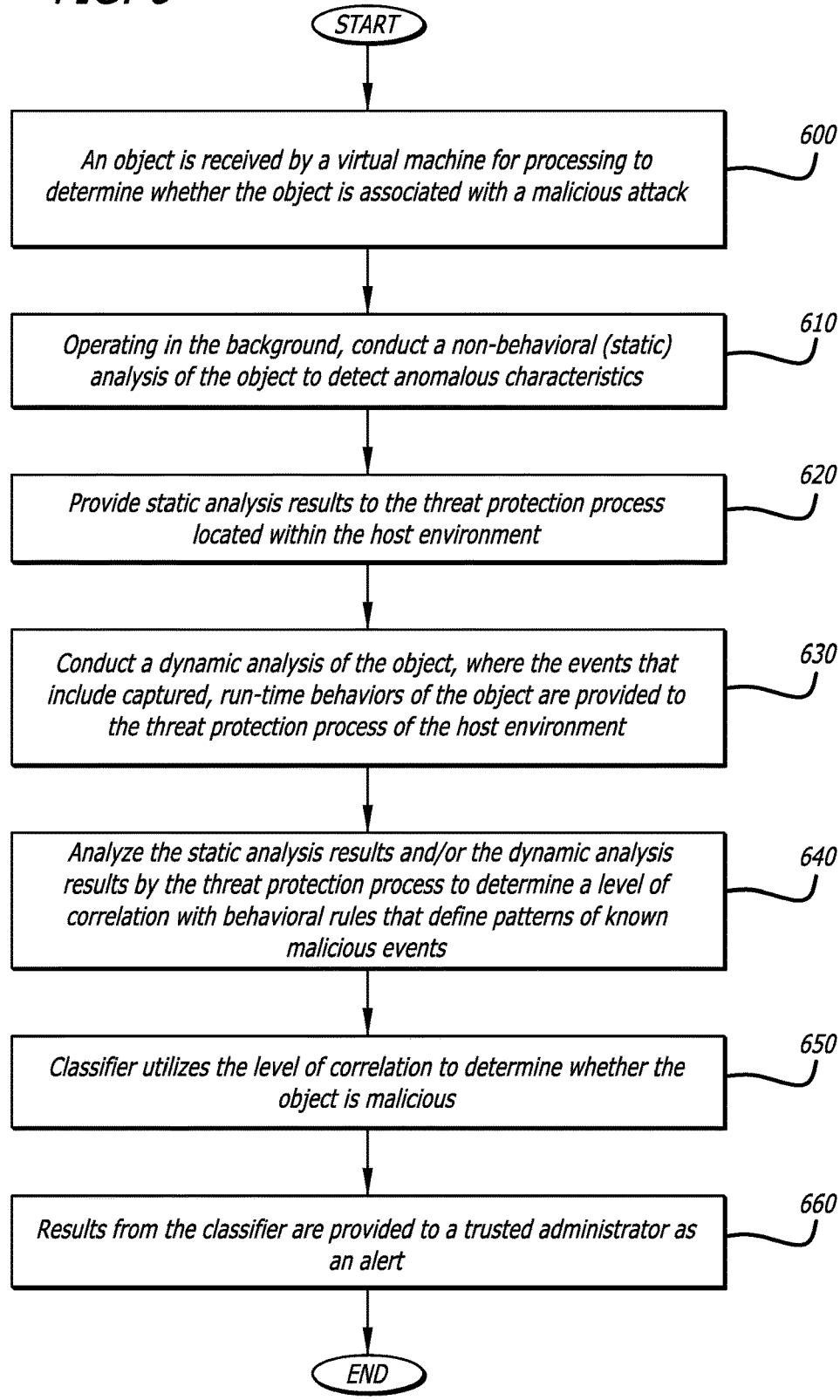
FIG. 6 is a flowchart of the operations associated with a virtualized environment of a computing device with threat protection functionality deployed within the host environment.

Referring to FIG. 6, a flowchart of exemplary operations of the virtualization software architecture of a computing device with threat protection functionality deployed within the host environment is shown. First, an object is received by a virtual machine for processing to determine whether the object is associated with a malicious attack (block 600). The virtual machine is present in a guest environment of the virtualization. The object is subjected to static analysis and/or dynamic analysis.

In accordance with the static analysis, the object undergoes non-behavioral analysis of the object, which includes analysis of the content of the object in order to detect anomalous characteristics (block 610). Such analysis may involve the use of signatures to determine whether certain data patterns provided by the signature match content associated with the object, where a match indicates that the content is benign (e.g., match an entry in a white list), suspicious (e.g., no or partial match of an entry in a black list) or malicious (e.g., match of an entry in the black list). The static analysis may further involve the use of heuristics, where certain rules and/or policies are applied to the content of the object to detect anomalous characteristics of the object. Such detection may identify that the object is suspicious and further dynamic analysis (i.e., monitoring run-time behavior of the object) is warranted. This static analysis may produce static analysis results (e.g., identification of communication protocol anomalies and/or suspect source addresses of known malicious servers), which may be provided to the threat protection process located within the host environment (block 620).

Additionally or in the alternative, a dynamic analysis of the object may be conducted, where results of the dynamic analysis are provided to the threat protection process of the host environment (block 630). The dynamic analysis results may include events, namely captured, run-time behaviors of the object. The threat protection process analyzes both the static analysis results and/or the dynamic analysis results to determine a level of correlation with behavioral rules that define, among other things, patterns (e.g., sequences) of known malicious events (block 640). This level of correlation identifies a level of risk (or a numerical score) that may be used to arrive at a decision of maliciousness, where the evaluation of the level of correlation is conducted in a host environment that is different from the guest environment in which the virtual machine operates. The classifier utilizes the level of risk (or numerical score) to determine whether the object is malicious and, where malicious (block 650). It is contemplated that this separation between the virtual machine and the threat protection process is conducted to reduce the possibility of the threat protection process being compromised if the virtual machine becomes compromised.

Thereafter, the results of the analysis from the threat protection component are returned to the guest environment, namely the reporting module, for placement into a perceivable format that is provided to a user (or administrator) via transmissions via a network adapter or a display adapter (where display of the results are available to the computing device) as set forth in block 660.

Figure 7:
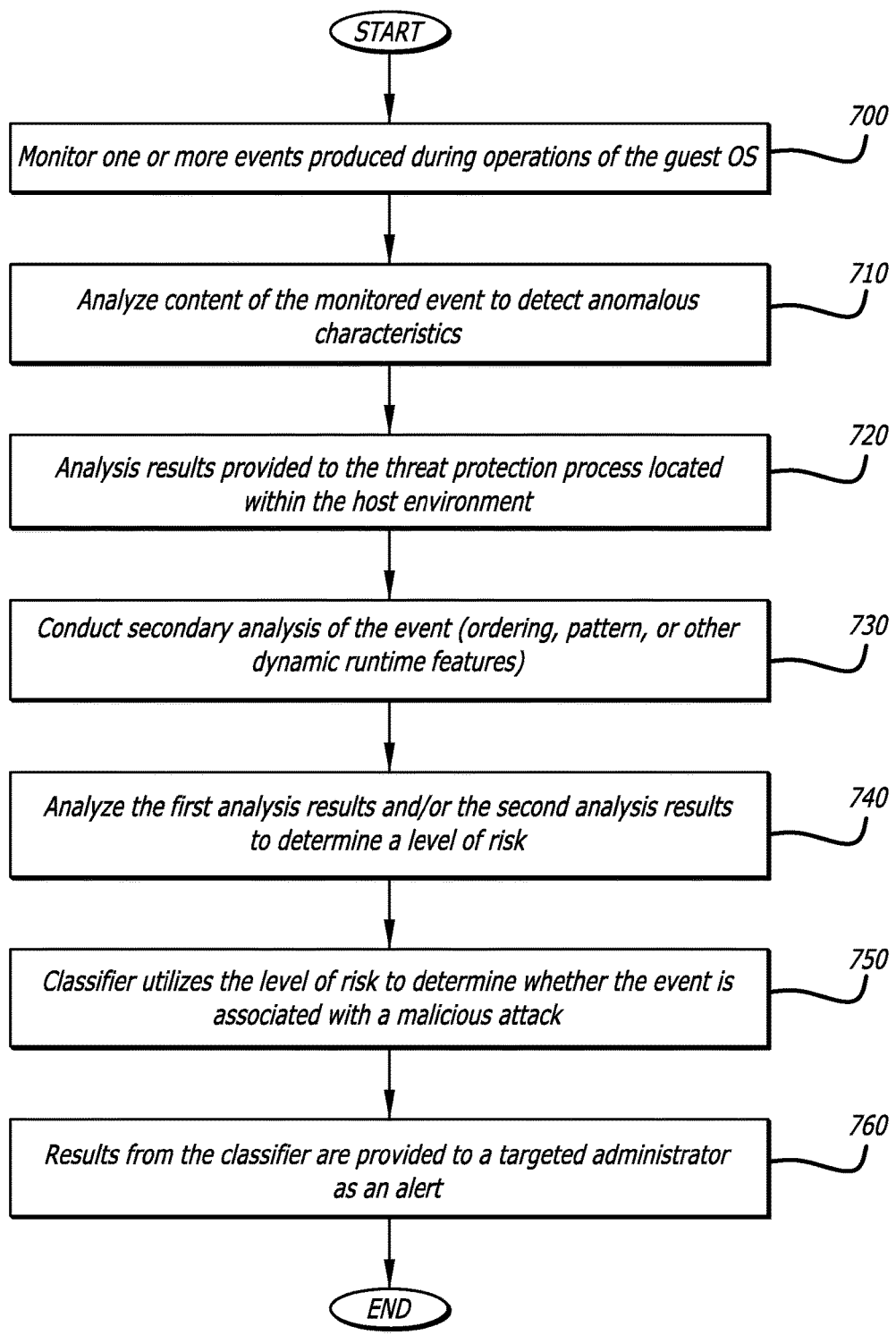
FIG. 7 is a flowchart of exemplary operations of the virtualization software architecture pertaining to a computing device with threat protection functionality deployed within the host environment.

Referring to FIG. 7, another flowchart of exemplary operations of the virtualization software architecture pertaining to a computing device with threat protection functionality deployed within the host environment is shown. First, one or more events produced during operations of the guest OS, such as the guest OS kernel, are monitored (block 700). Thereafter, the content associated with the monitored events is analyzed in order to detect anomalous characteristics (block 710). Such analysis may involve attempts to match content associated with the monitored events with data has already been determined to denote that the event is benign (e.g., match identifies expected content associated with the event) or malicious (e.g., match immediately identifies content that identifies anomalous behavior such as an unexpected call, unexpected disabling of a particular feature, or an anomalous memory access). The analysis may further involve the use of heuristics, where certain rules and/or policies are applied to the content of the event to detect anomalous characteristics. Such detection may identify that the event is suspicious (neither malicious nor benign) and further dynamic analysis (i.e., monitoring run-time behavior of the object) is warranted. Thereafter, results of the analysis may be provided to the threat protection process located within the host environment (block 720).

A secondary analysis of the event may be conducted, where an order or sequence of the event in connection with other monitored events may be analyzed and the results provided to the threat protection process of the host environment (block 730). Thereafter, the threat protection process analyzes both the first analysis results and/or the second analysis results to determine a level of correlation with behavioral rules that identifies a level of risk (or a numerical score) that may be used to arrive at a decision of maliciousness (block 740), where as before, the evaluation of the level of correlation is conducted in the host environment. The classifier utilizes the level of risk (or numerical score) to determine whether the object is malicious and, where malicious (block 750).

Thereafter, the results of the analysis from the threat protection component are returned to the guest environment, namely the reporting module, for placement into a perceivable format that is provided to a user (or administrator) via transmissions via a network adapter or a display adapter where display of the results are available to the computing device (block 760).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computing device comprising:
one or more hardware processors; and
a memory coupled to the one or more processors, the memory comprises one or more software components that, when executed by the one or more hardware processors, provide a virtualization software architecture including (i) a virtual machine, (ii) a plurality of hyper-processes and (iii) a hypervisor, wherein
the visual machine to operate in a guest environment and includes a process that is configured to monitor behaviors of data under analysis within the virtual machine,
the plurality of hyper-processes to operate in a host environment and isolated from each other within an address space of the memory, the plurality of hyper-processes include a threat protection process to classify the data under analysis as malicious or non-malicious based on the monitored behaviors and a guest monitor process configured to manage execution of the virtual machine and operate with the process to obtain and forward metadata associated with the monitored behaviors to the threat protection process, and
the hypervisor is configure to enforce temporal separation of the plurality of hyper-processes and enable inter-process communications between the plurality of hyper-processes.

2. The computing device of claim 1, wherein the process is a guest agent operating within the virtual machine and, when executed by the processor, monitors behaviors of the data under analysis that includes an object being processed by a guest application running in the guest environment.

3. The computing device of claim 1, wherein the process is a guest agent operating within a guest operating system (OS) of the virtual machine and, when executed by the processor, monitors behaviors of the data under analysis that includes one or more events based on operations by the guest OS during execution of the virtual machine.

4. The computing device of claim 3, wherein the one or more events are based on operations conducted by a guest OS kernel of the guest OS during processing of the data under analysis within the virtual machine.

5. The computing device of claim 1, wherein the threat protection process is further configured to determine whether the data under analysis is malicious or non-malicious completely outside the guest environment.

6. The computing device of claim 5, wherein the process is a guest agent operating within a guest operating system (OS) of the virtual machine and, when executed by the processor, monitors behaviors of the data under analysis that includes one or more events based on operations by the guest OS during execution of the virtual machine.

7. The computing device of claim 1, wherein the process is a guest agent operating within a guest operating system (OS) of the virtual machine and, when executed by the processor, communicates with the threat protection component to provide semantic information from inside the guest OS to the threat protection component.

8. The computing device of claim 7, wherein the semantic information from inside the guest OS is unavailable to the host environment, including the threat protection component, other than through the guest agent.

9. The computing device of claim 1, wherein the plurality of hyper-processes further includes a master controller process, the master controller process is configured to enforce policy rules directed to operations of the virtualization software architecture.

10. The computing device of claim 9, wherein a software component of the one or more software components comprises the hypervisor configured to enforce temporal separation of the plurality of hyper-processes.

11. The computing device of claim 1, wherein the plurality of hyper-processes operating in the host environment are based on code located in different binaries to isolate the plurality of hyper-processes from each other.

12. The computing device of claim 1, wherein the plurality of hyper-processes are isolated in which each hyper-process of the plurality of hyper-processes is running in its own separate address space.

13. The computing device of claim 1, wherein host environment including a master controller process, being a hyper-process operating separately from the plurality of hyper-processes.

14. The computing device of claim 1, wherein the hypervisor is configure to enforce temporal separation of all of the plurality of hyper-processes and enable inter-process communications between all of the plurality of hyper-processes.

15. The computing device of claim 1, wherein the plurality of hyper-processes operating in the host environment are isolated from each other when each of the plurality of hyper-processes are assigned different memory address spaces within the address space of the memory.

16. The computing device of claim 1, wherein the hypervisor enforces separation through a scheduling context, which is used for scheduling thread level activities within each of the plurality of hyper-processes.

17. The computing device of claim 16, wherein the scheduling context include a priority and a quantum time for execution of a thread within a protection domain associated with a first hyper-process of the plurality of hyper-processes.

18. A computerized method comprising:
configuring a virtualization software architecture with a guest environment and a host environment;
processing an object by a virtual machine operating in the guest environment, the virtual machine includes a process that monitors behaviors of the object during the processing of the object by the virtual machine;
classifying, by a plurality of hyper-processes operating in a host environment different from the guest environment, the object that undergoes processing by the virtual machine as malicious or non-malicious based at least on one or more of the monitored behaviors provided to a threat protection process being one of the plurality of hyper-processes; and
supporting inter-process communications between the plurality of hyper-processes by a hypervisor communicatively coupled to the plurality of hyper-processes,
wherein the plurality of hyper-processes include the threat protection process to classify the object as malicious or non-malicious based on the monitored behaviors and a guest monitor process configured to manage execution of the virtual machine and operate with the process to obtain and forward metadata associated with the monitored behaviors to the threat protection process that is isolated from the guest monitor process.

19. The computerized method of claim 18, wherein the process is a guest agent operating within the virtual machine and, when executed by a processor, monitors the behaviors of the object being processed by a guest application running in the virtual machine.

20. The computerized method of claim 18, wherein the process is a guest agent operating within a guest operating system (OS) of the virtual machine and, when executed by a processor, monitors behaviors of the object that includes one or more events based on operations by the guest OS during execution of the virtual machine.

21. The computerized method of claim 20, wherein the one or more events are based on operations conducted by a guest OS kernel of the guest OS during processing of the object within the virtual machine.

22. The computerized method of claim 18, wherein the threat protection process is further configured to determine whether the object is malicious or non-malicious completely outside the guest environment.

23. The computerized method of claim 18, wherein the process is a guest agent operating within a guest operating system (OS) of the virtual machine and, when executed by the processor, communicates with the threat protection process to provide semantic information from inside the guest OS to the threat protection process.

24. The computerized method of claim 23, wherein the semantic information from inside the guest OS is only made available to the threat protection process of the host environment from the guest agent.

25. The computerized method of claim 18, wherein the threat protection process is isolated from the guest monitor process in which code associated with threat protection process is stored within an address space used to store code associated with the guest monitor process.

26. A non-transitory storage medium including software that, when executed by a processor, configures a virtualization software architecture with a guest environment and a host environment including a hypervisor, the medium comprising:
a virtual machine operating in the guest environment, the virtual machine to process an object and monitor behaviors of the object during processing of the object;
a plurality of hyper-processes operating in a host environment different from the guest environment, the plurality of hyper-processes including a threat protection process to classify the object as malicious or non-malicious based at least on one or more of the monitored behaviors provided to the threat protection process; and
supporting inter-process communications between the plurality of hyper-processes by the hypervisor communicatively coupled to the plurality of hyper-processes,
wherein the plurality of hyper-processes include the threat protection process to classify the object as malicious or non-malicious based on the monitored behaviors and a guest monitor process configured to manage execution of the virtual machine and operate with the process to obtain and forward metadata associated with the monitored behaviors to the threat protection process that is isolated from the guest monitor process.

27. The non-transitory storage medium of claim 26, wherein a guest agent is operating within the virtual machine to monitor the behaviors of the object being processed by a guest application running in the virtual machine.

28. The non-transitory storage medium of claim 26, wherein a guest agent is operating within a guest operating system (OS) of the virtual machine and, when executed by the processor, monitors behaviors of the object that includes one or more events based on operations by the guest OS during execution of the virtual machine.

29. The non-transitory storage medium of claim 28, wherein the one or more events are based on operations conducted by a guest OS kernel of the guest OS during processing of the object within the virtual machine.

30. The non-transitory storage medium of claim 26, wherein the threat protection process is further configured to determine whether the object is malicious or non-malicious completely outside the guest environment.

31. The non-transitory storage medium of claim 26, wherein a guest agent is operating within a guest operating system (OS) of the virtual machine and, when executed by the processor, communicates with the threat protection process to provide semantic information from inside the guest OS to the threat protection process.

32. The non-transitory storage medium of claim 31, wherein the semantic information from inside the guest OS is only made available to the threat protection process of the host environment from the guest agent.

33. The computerized method of claim 18, wherein the threat protection process is isolated from the guest monitor process as the threat protection process is assigned a memory address space that is separate from and different than a memory address space assigned to the guest monitor process.

34. The non-transitory storage medium of claim 26, wherein the threat protection process is isolated from the guest monitor process as the threat protection process is assigned a memory address space that is separate from and different than a memory address space assigned to the guest monitor process.

* * * * *